US011800326B2

(12) United States Patent
Haines et al.

(10) Patent No.: US 11,800,326 B2
(45) Date of Patent: Oct. 24, 2023

(54) ISSUING REMOTE COMMANDS TO TRACKING DEVICES

(71) Applicant: Tile, Inc., San Mateo, CA (US)

(72) Inventors: Jossie Haines, Campbell, CA (US); Josselin de la Broise, Mountain View, CA (US); Steven R. Klinkner, Palo Alto, CA (US); Dan Danknick, San Mateo, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 18/045,446

(22) Filed: Oct. 10, 2022

(65) Prior Publication Data

US 2023/0058680 A1    Feb. 23, 2023

Related U.S. Application Data

(63) Continuation of application No. 16/912,492, filed on Jun. 25, 2020, now Pat. No. 11,470,447, which is a continuation-in-part of application No. 16/515,523, filed on Jul. 18, 2019, now Pat. No. 11,223,927, which is a continuation of application No. 15/862,491, filed on Jan. 4, 2018, now Pat. No. 10,405,144.

(51) Int. Cl.
| | |
|---|---|
| *H04W 4/029* | (2018.01) |
| *H04W 4/02* | (2018.01) |
| *H04W 4/021* | (2018.01) |
| *H04W 4/80* | (2018.01) |
| *H04M 1/72412* | (2021.01) |
| *H04M 1/72415* | (2021.01) |
| *H04L 67/52* | (2022.01) |
| *H04L 67/50* | (2022.01) |

(52) U.S. Cl.
CPC ............. *H04W 4/029* (2018.02); *H04L 67/52* (2022.05); *H04L 67/535* (2022.05); *H04M 1/72412* (2021.01); *H04M 1/72415* (2021.01); *H04W 4/021* (2013.01); *H04W 4/023* (2013.01); *H04W 4/80* (2018.02)

(58) Field of Classification Search
CPC ..................................................... H04W 4/023
USPC ................................. 455/456.3, 404.2, 415
See application file for complete search history.

(56) References Cited

U.S. PATENT DOCUMENTS

| | | | |
|---|---|---|---|
| 8,712,373 B2 * | 4/2014 | Ward .................... | H04L 63/101 455/406 |
| 2007/0171046 A1 * | 7/2007 | Diem .................. | H04W 12/084 340/539.13 |

* cited by examiner

*Primary Examiner* — Kiet M Doan
(74) *Attorney, Agent, or Firm* — Baker Botts L.L.P.

(57) ABSTRACT

In one embodiment, a method includes receiving, by a tracking system server, an instruction from relating to a feature of a second computing device. The method includes, in response to receiving a notification that a third computing device has received a tracking signal from the second computing device, transmitting an instruction for the second computing device relating to the feature to the third computing device. The method includes receiving a response message indicating that the second computing device has not received the instruction for the second computing device and transmitting a request to retransmit the instruction to the second computing device. The method includes receiving a response message from the third computing device indicating that the second computing device has acknowledged the instruction and transmitting a response message to the first computing device indicating that the second computing device has acknowledged the instruction.

17 Claims, 17 Drawing Sheets

US 11,800,326 B2

ISSUING REMOTE COMMANDS TO TRACKING DEVICES

PRIORITY

This application is a continuation under 35 U.S.C. § 120 of U.S. patent application Ser. No. 16/912,492, now U.S. Pat. No. 11,470,447, which is a continuation-in-part under 35 U.S.C. § 120 of U.S. patent application Ser. No. 16/515,523, filed 18 Jul. 2019, now U.S. Pat. No. 11,223,927, which is a continuation under 35 U.S.C. § 120 of U.S. patent application Ser. No. 15/862,491, filed 4 Jan. 2018, now U.S. Pat. No. 10,405,144, each of which are incorporated herein by reference.

TECHNICAL FIELD

This disclosure generally relates to tracking devices, and more specifically, to restricting the functionality of a tracking device or a device connected to or integrated with the tracking device when the tracking device is lost.

BACKGROUND

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost). If the object is lost, the object will still be able to function; for example, if a user loses a set of headphones or another type of electronic device, a person who comes across the lost headphones or steals the headphones could use them. If the object were disabled, this may help discourage theft.

Figure 1:
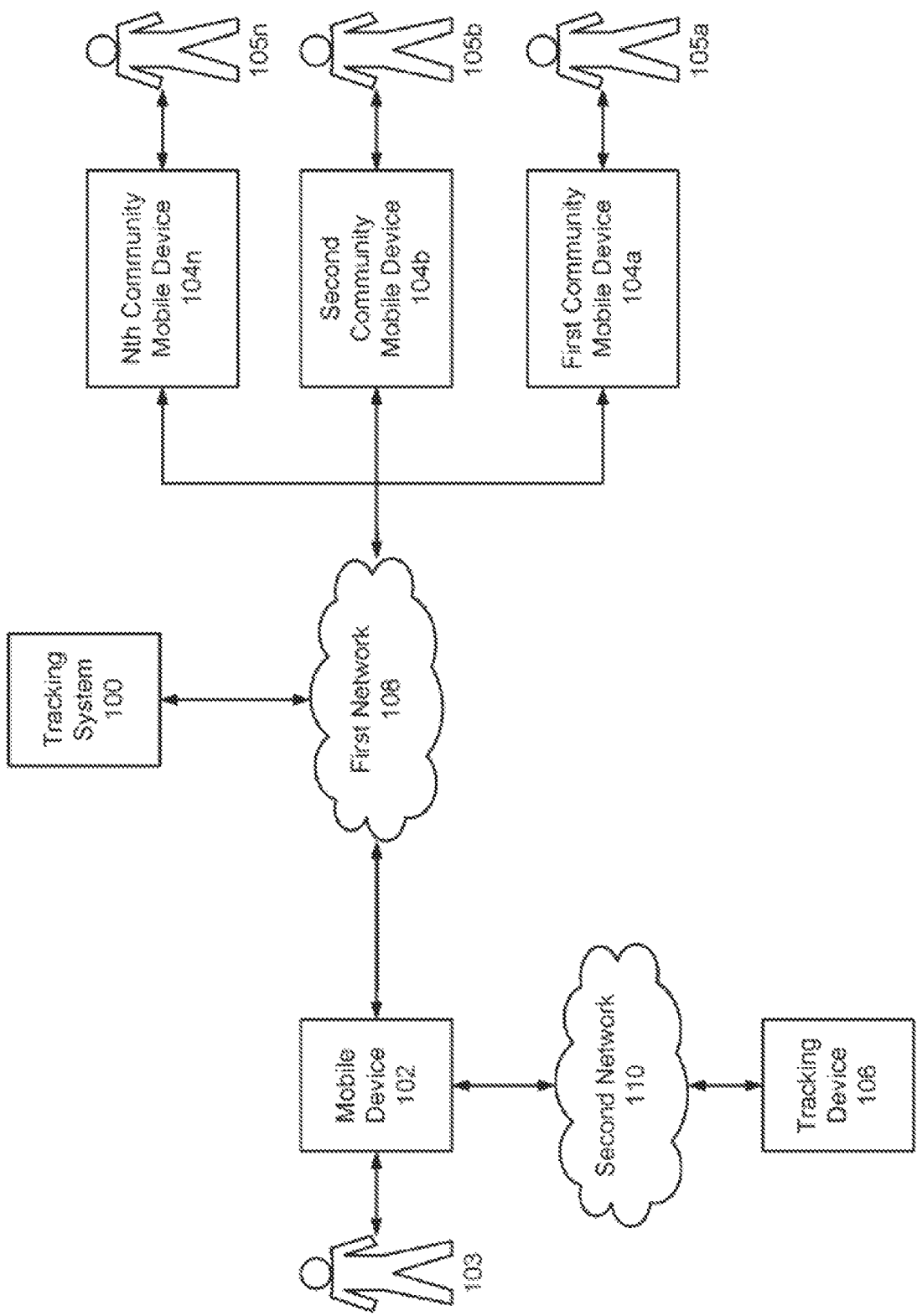
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera, a laptop computer, a portable computing device) that has an integrated tracking component that allows the device to be tracked. The user can then use a mobile device (e.g., by way of a software application installed on the mobile device) or other computing device or service to track the tracking device. For example, the computing device can perform a local search for a tracking device by sending a beacon signal out seeking a connection with the tracking device. However, in situations where the user is unable to locate the tracking device using their own computing device (e.g., if the tracking device is beyond a distance within which the computing device and the tracking device can communicate), the user can leverage the capabilities of a community of users of a tracking device system. In such situations, the user may designate the tracking device as "lost" and request that some functionality of the tracking device be disabled or may provide some other instructions for the functionality of the tracking device. For example, if the tracking device has a tracking component and a different primary device function (e.g., playing sound if the tracking device is a wireless speaker), the primary device function can be disabled to render the tracking device unusable to a potential thief. While this primary function is disabled, the tracking component can remain enabled, allowing the user to locate the lost tracking device. As another example, the user can provide instructions for the primary device function (e.g., playing a loud tone if the tracking device is included in a wireless speaker, restricting access to the device until a specific code is entered, deleting some or all data stored by the tracking device). As another example, if the tracking device is attached to another object, the user can disable the tracking device to prevent a potential thief from taking the tracking device and repurposing it (e.g., to track an object owned by the thief, or to sell to another potential user interested in tracking an object).

A tracking system (also referred to herein as a "cloud server," "tracking server," "tracking system server," or simply "server") can maintain user profiles associated with a plurality of users of the tracking system. The tracking system can associate each user within the system with one or more tracking devices associated with the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more computing devices associated with the community of users in communication with the tracking system. The tracking system can set a particular status for the tracking device in a database of the tracking system. For example, the tracking system can set a flag indicating the tracking device is lost. When one mobile device of a community of mobile devices (also referred to herein as a "community mobile device" or "community computing device") that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. In addition, the tracking system can transmit an instruction to the community mobile device to forward to the tracking device. For example, the tracking system can send an instruction that will cause the tracking device to disable one or more features. This will limit the usefulness of the tracking device to another person if the tracking device has been stolen or is at risk of being stolen. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. As another example, a laptop computing device can include tracking device components. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage, control, and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range including, but not limited to, Bluetooth, Bluetooth Low Energy (BLE), near-field communication (NFC), Z-Wave, ZigBee, Ultra-wide Band (UWB). In some configurations, the second network 110 is a point-to-point network including the tracking device 106 and one or more mobile devices that fall within a proximity of the tracking device 106 sufficient to support communication between the tracking device 106 and one or more mobile devices. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. As another example, the mobile device 102 can utilize features support by the communication protocol used to detect the communication signal from the tracking device 106 to determine a more precise location and orientation of the tracking device 106 to the mobile device 102. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost (from the perspective of the mobile device 102) to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. The mobile device 102 can send an indication of a lost device automatically based on determination that the tracking device 106 is outside of communication range of the mobile device 106. For example, if the mobile device 102 has not received a communication signal or beacon from the tracking device 106 for a period of time satisfying a threshold period of time, the mobile device 102 may determine that the tracking device 106 may be lost. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent). In some embodiments, the lost indication can include an instruction relating to a feature of the tracking device, such as to disable a feature of the tracking device, as described in detail with respect to FIGS. 6-9 or to provide other instructions to the tracking device, as described in detail with respect to FIGS. 10-17.

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can also receive any other instruction from the user 103. The tracking system 100 can then process the indication or instruction in order to help the user 103 find the tracking device 106 and deliver any instructions. For example, the tracking system 100 can leverage the capabilities of the community mobile devices 104 to help find the tracking device 106 and deliver commands. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find and identify the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a last known or potential location of the tracking device 106.

As shown in FIG. 1 and as mentioned above, the tracking system 100 can communicate with a plurality of community mobile devices 104 associated with corresponding community users 105. For example, an implementation may include a first community mobile device 104*a* associated with a first community user 105*a*, a second community mobile device 104*b* associated with a second community user 105*b*, and additional communication mobile devices associated with additional community users up to an nth community mobile device 104*n* associated with an nth community user 105*n*. The community mobile devices 104 may also include functionality that enables each community mobile device 104 to identify a tracking device 106 within a proximity of the community mobile device 104. In one example, a first community mobile device 104*a* within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104*a* at the time of the communication with the tracking device 106, a location of the tracking device 106 relative to the first mobile computing device 104*a* at the time of the communication with the tracking device 106, a location of the tracking device 106 at the time of the communication with the tracking device 106). This information can be used to provide updated locations and/or respond to a location request from the tracking system 100 regarding the tracking device 106. In some embodiments, the steps performed by the first community mobile device 104*a* can be hidden from the first community user 105*a*. Accordingly, the first community mobile device 104*a* can assist in locating the tracking device 106 without notifying the first community user 105*a*—potentially bothering the first community user 105*a* by interrupting them—and without the knowledge of the first community user 105*a*.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, mobile device, laptop, wireless speaker, headphones, or other object that the user 103 may track. Additionally, the tracking device 106 may include a speaker for emitting a sound and/or a transmitter for broadcasting a beacon (also referred to herein as a "beacon signal"). In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a closer proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. The power and direction of the signal emitted from the tracking device 106 may be used to determine an approximate location of the tracking device 106 relative to the receiving device. In some cases, the strength of signal or absence of a signal may be used to indicate that a tracking device 106 is lost.

System Overview

Figure 2:
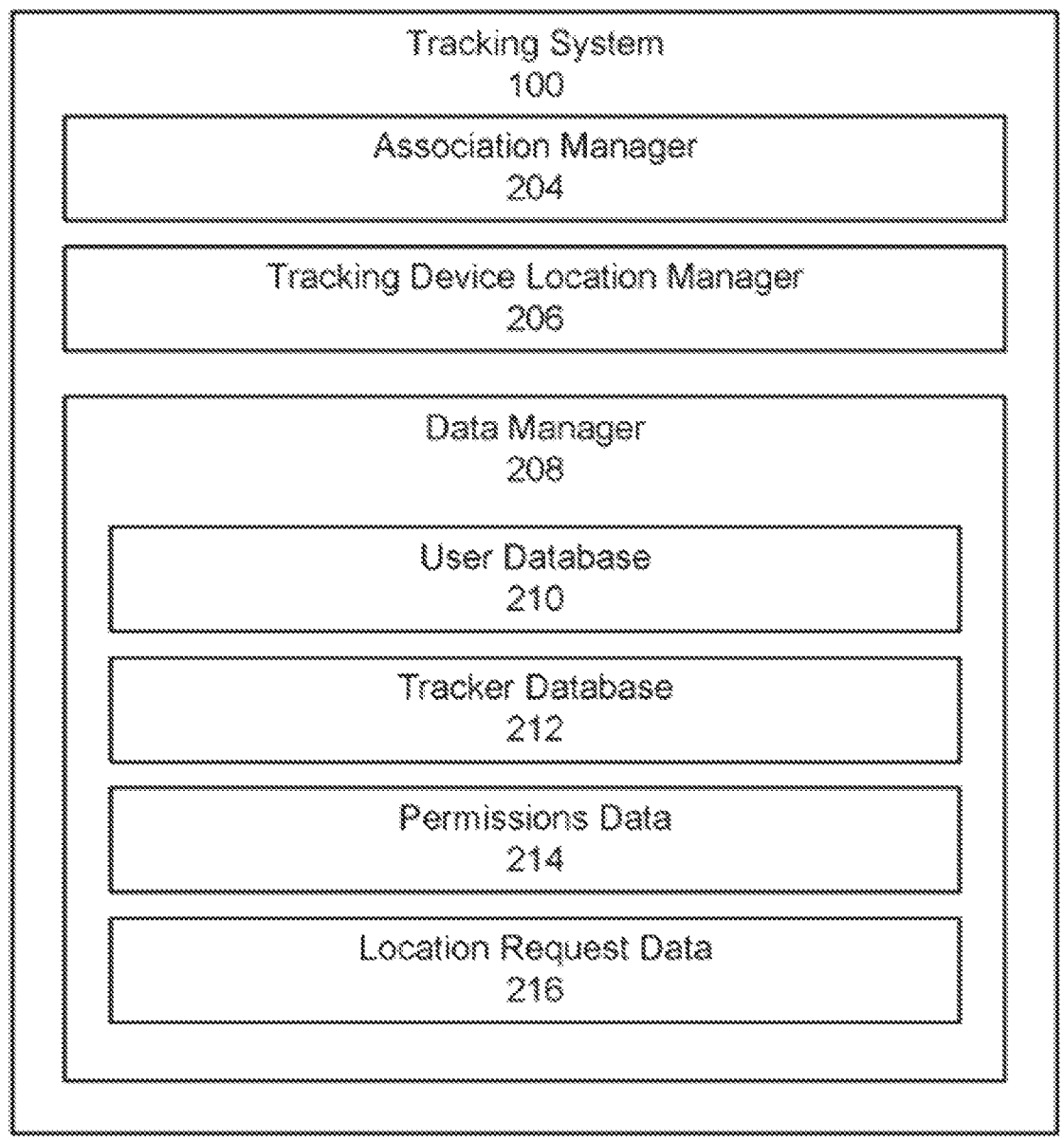
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102 (or any other computing device), and the association manager 204 may be used to link the user information and tracking information. The association between user 103 and tracking device 106 may be used for authentication purposes, or for storing user information, tracking device information, permissions, or other information about a user 103 and/or tracking device 106 in a database for easy reference by the tracking system or another component requiring such information.

The tracking system 100 also includes a tracking device location manager 206. The tracking device location manager 206 may receive and process a command from a mobile device (e.g., mobile device 102 or community mobile devices 104). The command may include an instruction for a tracking device 106 or an indication that the tracking device 106 is lost. For example, the tracking system 100 may receive a lost indication from a mobile device 102 indicating that the tracking device 106 is lost. The tracking device location manager 206 may set a status or flag in a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any status or flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

In some embodiments, the tracking device location manager 206 also receives and processes instructions relating to one or more features of a tracking device 106. A lost indication from a mobile device 102 indicating that the tracking device 106 is lost may be accompanied by an instruction to disable one or more features of the tracking device 106. The feature(s) to disable may be included in the instruction, or the tracking system 100 or tracking device 106 may store information indicating which feature(s) to disable in response to a disable instruction. Instructions relating to a feature of a tracking device 106 may also be sent outside of the context of a lost indication. In other embodiments, when the tracking device location manager 206 receives a lost indication for a tracking device, the tracking device location manager 206 may look up instructions associated with the tracking device 106, e.g., in the data manger 208, and forwards appropriate instructions for selected feature of the tracking device 106. Disabling features of lost tracking devices is described further with reference to FIGS. 6 through 9. Providing instructions to tracking devices, including lost tracking device, is describe further with reference to FIGS. 10-17.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106 or may be stored without an association to a particular tracking device. For example, a community user 105 may provide user information and permit performance of tracking and management functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost or is associated with a pending instruction, and whether any incoming communications with regard to that tracking device 106 should be processed based on the presence of a flag associated with the tracking device 106. The tracker database 212 may also include feature information about tracking devices 106, whether one or more features of a tracking device 106 are associated with a pending instruction, whether one or more features of a tracking device 106 should be disabled when lost, and whether one or more features of a tracking device 106 are currently disabled or have been instructed to be disabled.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate, manage, or receive a location of a tracking device 106. Location request data 216 may include information related to a location request or a lost indication received from the user 103 via a mobile device 102.

Figure 3:
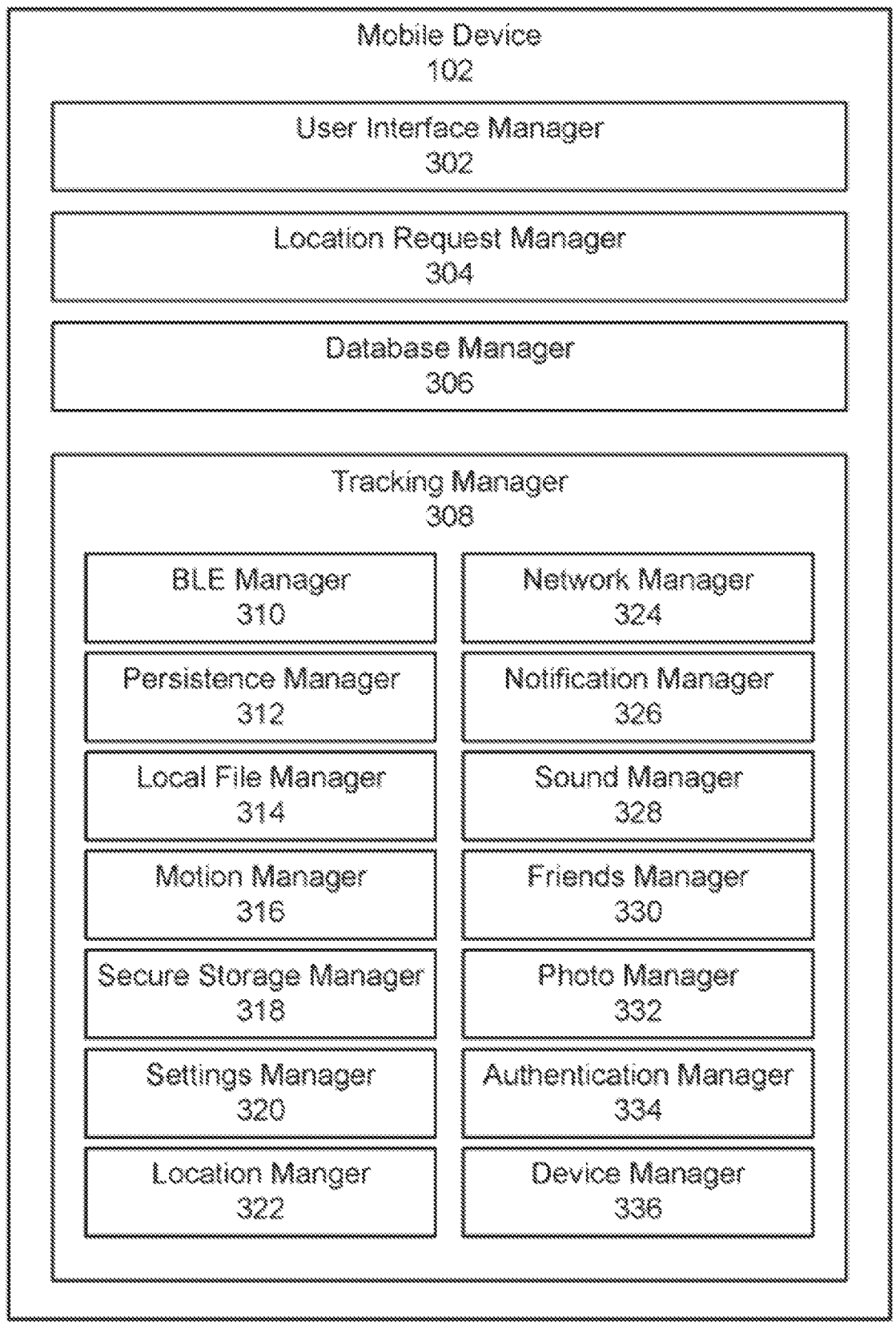
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100 through one or more interactive user interface elements. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100 or to send an instruction to the tracking device 106 through the tracking system 100. For example, the user 103 may provide an indication that a tracking device 106 is lost, unreachable, or otherwise unavailable, and/or that one or more features of the tracking device 106 should be disabled, from the mobile device 102 via the user interface manager 302, and the location request manager 304 may process the lost indication and/or instructions and provide any necessary data to the tracking system 100 for processing and relaying a location request and/or disabling instruction to other users 105 over a network 108. In some configurations, an indication that a tracking device 106 is lost is provided via user input received via user interaction with one or more interactive elements of a user interface. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100 and can display the most recent location via the user interface manager 302.

The mobile device 102 may also include a database manager 306. The database manager 306 may maintain data related to the user 103, tracking device 106, permissions, or other data that may be used for locating a tracking device 106, managing a tracking device 106, and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application associated with the tracking system) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310 (or equivalent manager for managing the communication network used to communicate with tracking devices), a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106 via a communication network. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
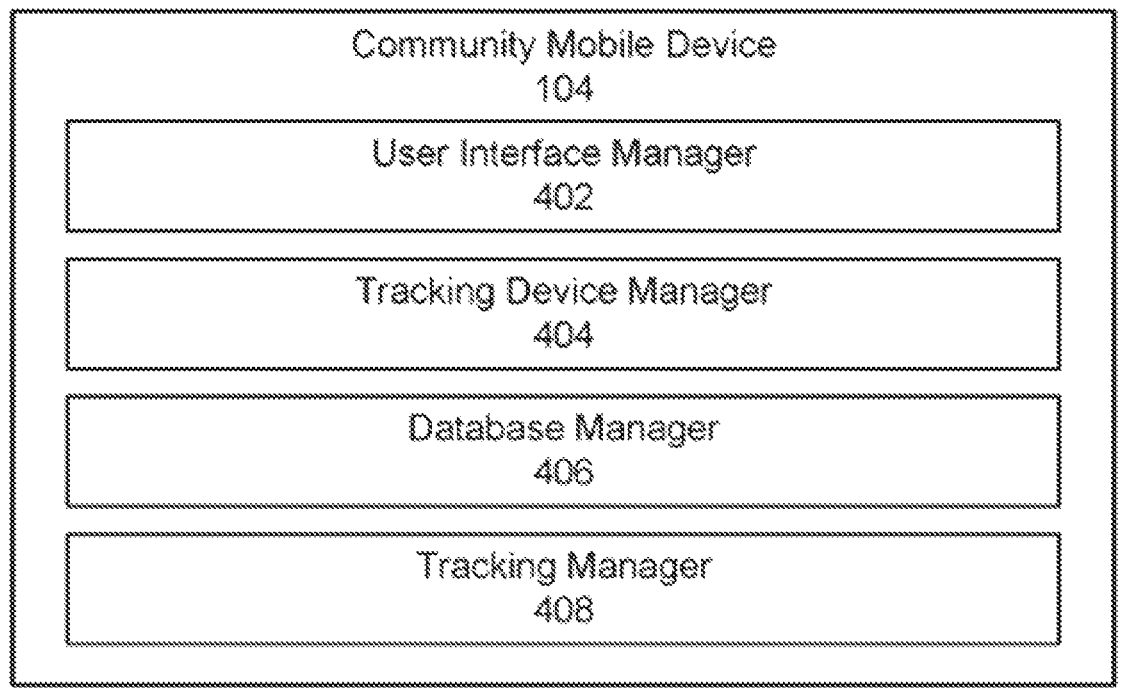
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106 without notifying a user of the community mobile device 104. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost and provide a location of the tracking device 106 if it comes within proximity of, or communicative range of, the community mobile device 104. In some configurations, the community mobile device 104 is constantly scanning nearby areas to determine if there is a tracking device 106 within a proximity of the community mobile device 104. In some configurations, the community mobile device 104 is constantly available to receive signal beacons from tracking devices 106 in the communicative range of the community mobile device 104. Therefore, where a tracking device 106 that matches information provided by the tracking system 100 (e.g., from the location request) comes within proximity of, or communicates with, the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may also be used to relay instructions to the tracking device 106, e.g., instructions for or to disable a feature of the tracking device 106. In particular, the tracking system 100 may transmit instructions to the community mobile device 104 in response to receiving the response to the location request to the tracking system 100 from the community mobile device 104. The tracking device manager 404 in turn forwards the instructions to the tracking device 106, and in response to the instructions, the tracking device 106 performs an action relating to a particular feature, such as disabling the feature. The relevant feature(s) may be included in the instructions, or the tracking device 106 may store information regarding which feature(s) to disable in response to a generic disable instruction.

The tracking device manager 404 may additionally provide other information to the tracking system 100 in response to receiving the tracking request. For example, in addition to providing a location of the community mobile device 104 or tracking device 106 as ascertained by the community mobile device 104, the tracking device manager 404 may provide a signal strength or other indicator associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
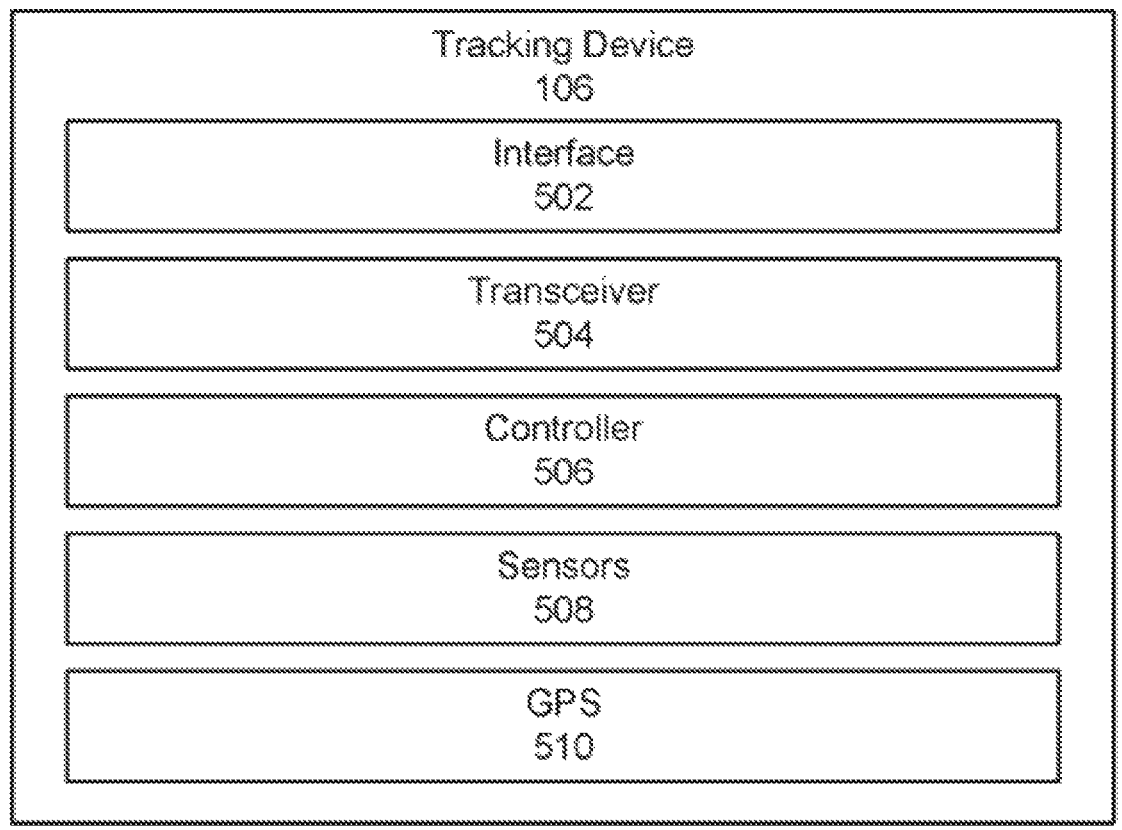
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and a GPS unit 510. The transceiver 504 is a hardware circuit capable of both transmitting and receiving signals. It should be noted that in other embodiments, the tracking device 106 includes fewer, additional, or different components than those illustrated in FIG. 5. For instance, tracking devices might not include the GPS unit 510 and can still implement the functionalities described herein.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, UWB connection, NFC connection, or pairing protocol associated with another short-range communication protocol, though in other embodiments, the interface 502 can manage other suitable wireless connection protocols (such as WiFi, Global System for Mobile Communications (GSM), Long Term Evolution (LTE), and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions, related to tracking or another (primary) function, or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508 or the GPS 510, or based on any other suitable criteria. The controller 506 may selectively disable or enable features of the tracking device 106 according to instructions received from a mobile device 102 or community mobile device 104.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506. The GPS unit 510 is configured to detect a location of the tracking device 106 based on received GPS signals, and is configured to provide detected locations to the controller 506.

Disabling Features of Lost Tracking Device

Figure 6:
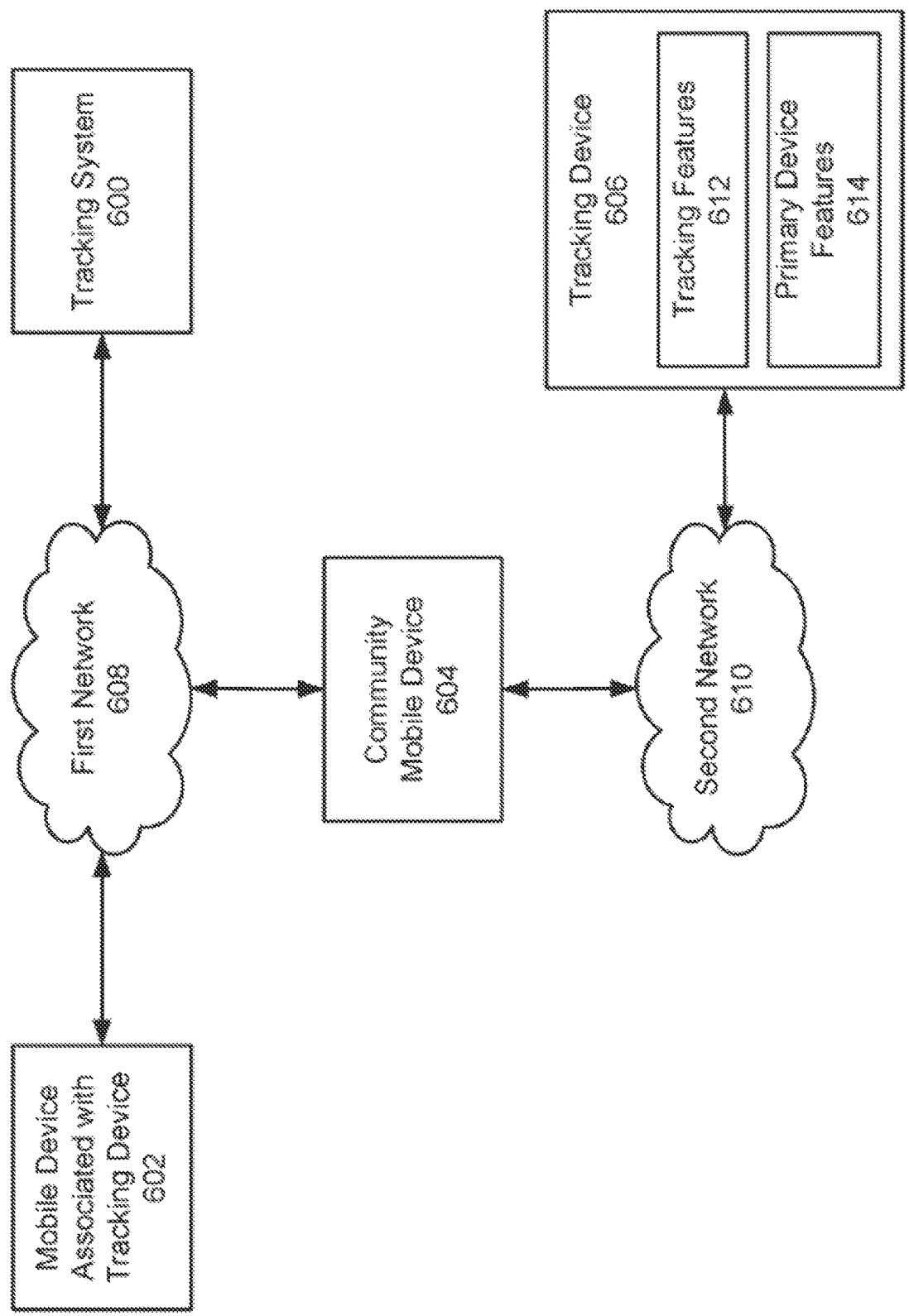
FIG. 6 illustrates an environment for disabling a feature of a tracking device, according to one embodiment.

FIG. 6 illustrates an environment for disabling a feature of a tracking device 606, according to one embodiment. The environment includes a tracking system 600, a mobile device 602 associated with the tracking device 606, a community mobile device 604, and two networks 608 and 610. The tracking system 600, mobile device 602 associated with the tracking device, community mobile device 604, first network 608, and second network 610 are similar to the tracking system 100, mobile device 102, community mobile device 104, first network 108, and second network 110 described with respect to FIGS. 1 through 4. The tracking system 600 can associate the mobile device 602 and/or a user of the mobile device 602 with the tracking device 606, e.g., using an association manager, as described above with respect to FIGS. 1 and 2.

In the embodiment shown in FIG. 6, the tracking device 606 is not a dedicated tracking device—instead, it is configured to perform one or more primary device features 614, and also includes tracking features 612. As discussed above, a tracking device can include one or more primary functions (here, the primary device features 614) and secondary tracking device functions, which are enabled by the tracking features 612. The tracking features 612 may be implemented by some or all of the components of the tracking device 106 described with respect to FIG. 5. The tracking device 606 can include one or more functional components configured to implement the primary device features 614, which are unrelated to tracking of the tracking device 606.

As an example, the tracking device 606 is a wireless speaker with primary device features 614 of receiving an input signal (e.g., a Wi-Fi or Bluetooth signal), outputting audio based on the received signal, and receiving and responding to playback commands (play, pause, stop, skip, raise or lower volume, etc.). The wireless speaker can also include tracking features 612 that allow a user to track and/or locate the wireless speaker. Certain components of the wireless speaker may be used to implement both the tracking features 612 and the primary device features 614. For example, if the wireless speaker is a Bluetooth speaker, the Bluetooth communications interface may be used both to connect to a mobile device for playing music, and to transmit beacon signals used to locate the wireless speaker.

The tracking features 612 may be implemented using a tracking device platform. For example, a tracking device provider can provide an SDK or custom chipset that, when incorporated into the tracking device 606, enable the tracking features 612. This allows the device to function as a tracking device, e.g., by communicating with other devices within the tracking device ecosystem and responding to tracking-related commands from devices within the tracking device ecosystem. If the tracking features 612 are integrated into the tracking device 606 using an SDK, the tracking device 606 may not have any special-purpose hardware included for the tracking component 612. In other embodiments, one or more hardware components, such as a communications interface or motion sensors, are included in the tracking device 606 to enable the tracking features 612, e.g., if these components are not used to implement the primary device features 614.

As described further below, the tracking features 612 may also include a feature for receiving a disabling instruction and implementing the disabling instruction in the tracking device 606. For example, the tracking features 612 may be implemented by one or more components for transmitting a tracking signal (e.g., a beacon signal), receiving an instruction to disable one of the primary device features 614, and transmitting the instruction to disable the feature to a component for implementing the primary device features 614.

If the tracking device 606 is lost, the mobile device 602, tracking system 600, and community mobile device 604 can interact with each other and with the tracking device 606 to set a lost flag in the tracking system 600 and locate the tracking device 606 as described with respect to FIGS. 1-4. In addition, the tracking system 600 may transmit an instruction to the tracking device 606, via the first network 608, community mobile device 604, and second network 610, to disable one or more features of the tracking device 606.

In one embodiment, the mobile device 602 transmits a request to disable a feature of the tracking device 606 if, for example, the user of the mobile device 602 believes that the tracking device 606 has been stolen, or is at risk of being stolen (e.g., if the user left the tracking device 606 in a public place). The disabling instruction may be an instruction to disable all primary device features 614, all tracking features 612, all primary and tracking features 612 and 614, or a single identified feature or subset of features. The instruction may depend on the abilities of the tracking device 606. For example, if the tracking device 606 is a wireless speaker or wireless headphones, the instruction may disable the tracking device 606 from pairing (e.g., via a Bluetooth connection) with a second device. Even if forming a Bluetooth connection is disabled, the tracking device 606 may still be able to use the Bluetooth communications interface of the tracking device 606 for the tracking features 612, e.g., to transmit beacon signals or receive instructions from the community mobile device 614. As another example, if the tracking device 606 is an electronic key for a car, the instruction to disable the tracking device 606 may disable all primary device features 614, e.g., features for locking, unlocking, opening the trunk, setting off the panic button, or starting the car. This would prevent a potential thief from finding or gaining access to the car.

In different embodiments, the instructions can be sent from or stored at the mobile device 602, the tracking system 600, or the tracking device 606. In one embodiment, the mobile device 602 is configured to receive an explicit "disable" instruction from the user, or an instruction from the user to disable a particular identified feature or set of features. In another embodiment, the mobile device 602 generates a disable instruction in response to receiving an indication from the user that the tracking device 606 is lost; in this case, one or more parameters of the disabling instruction (e.g., which feature(s) to disable, conditions for transmitting the disabling instruction) may be locally stored on the mobile device 602 and configured by the user. In another embodiment, the tracking system 600 stores disabling instructions for a tracking device 606. When the user sets up the tracking features 612 of the tracking device 606, the user may have the option to provide one or more rules for disabling the tracking device 606 that are administered by the tracking system 600, e.g., disable primary device features 614 whenever the tracking device 606 is marked as lost, disable primary device features 614 if the tracking device 606 is lost and determined to located in a public place, disable all device features 612 and 614 if the tracking device 606 is more than a threshold distance away from the mobile device 602, etc. In other embodiments, one or more rules for disabling the tracking device 606 may be set by the tracking system 600 or may be provided to the tracking system 600 by the manufacturer of the tracking device 606. In yet another embodiment, the tracking device 606 stores instructions to disable itself if it is lost, e.g., in response to receiving a notification from the community mobile device 604 that it is lost, or in response to determining that the tracking device 606 is no longer within a communications range of the mobile device 602. These instructions may be provided by the user (e.g., when configuring the tracking device 606 directly or with the mobile device 602), by the tracking system 600, or by the manufacturer of the tracking device 606.

In some cases, the tracking device 606 only includes tracking features 612, i.e., the primary function of the tracking device 606 is for tracking. In such embodiments, the tracking features 612 can be disabled according to instructions provided by the mobile device 602 or set at the tracking system 600 or tracking device 606. In this case, disabling the tracking device 606 can prevent an unauthorized user from stealing and repurposing the tracking device 606 to track an item belonging to the unauthorized user.

In some embodiments, the tracking device 606 may have features disabled in stages. As an example, a portion of the primary device features 614 are initially disabled when the tracking device 606 is lost. If a preset length of time passes, additional features (e.g., all primary features 614, or a portion of the tracking features 612) are also disabled. Disabling features in stages may preserve battery power of the lost tracking device 606 while still allowing the user to locate the tracking device 606. If a portion of the features are disabled initially, and then the tracking device 606 is marked permanently lost by the user via the mobile device 602, or if a preset length of time has passed, all features of the tracking device 606 may be disabled. In some embodiments, the user can specify different features of the tracking device to disable. For example, if the user loses a wireless speaker, the user may first request that a feature for outputting sounds is disabled to avoid drawing attention to the lost wireless speaker. If, after a period of time, the user does not find the wireless speaker, the user may request through the mobile device 602 to disable a second feature allowing the wireless speaker to pair to other devices. This request is transmitted in a manner similar to the first request (e.g., by an instruction that passes from the mobile device 602 to the tracking system 600, to the community mobile device 604, and finally to the tracking device 606), and the wireless speaker disables the additional feature of pairing to another device.

In some embodiments, after the tracking device 606 has disabled the feature(s), the tracking device 606 re-enables the feature(s) in response to re-enable instructions provided by the mobile device 602. For example, if the mobile device 602 comes within the communication range of the tracking device 606, the mobile device 602 automatically transmits instructions to the tracking device 606 to re-enable the feature(s). Alternatively, the mobile device 602 can transmit re-enable instructions in response to a request from the user of the mobile device 602 that the tracking device 606 re-enable the feature(s). As another example, if the mobile device 602 or the user of the mobile device 602 determines that the tracking device 606 is safe (e.g., it has been recovered by a trusted community member or a friend), the mobile device 602 can transmit, automatically or in response to user input, a request for the tracking device 606 to re-enable the feature(s). If the mobile device 602 is still out of range of the mobile device 602, this request is transmitted from the mobile device 602 to the tracking system 600, which forwards the request to the community mobile device 604 (or another community mobile device), which forwards the request to the tracked device 606.

Figure 7:
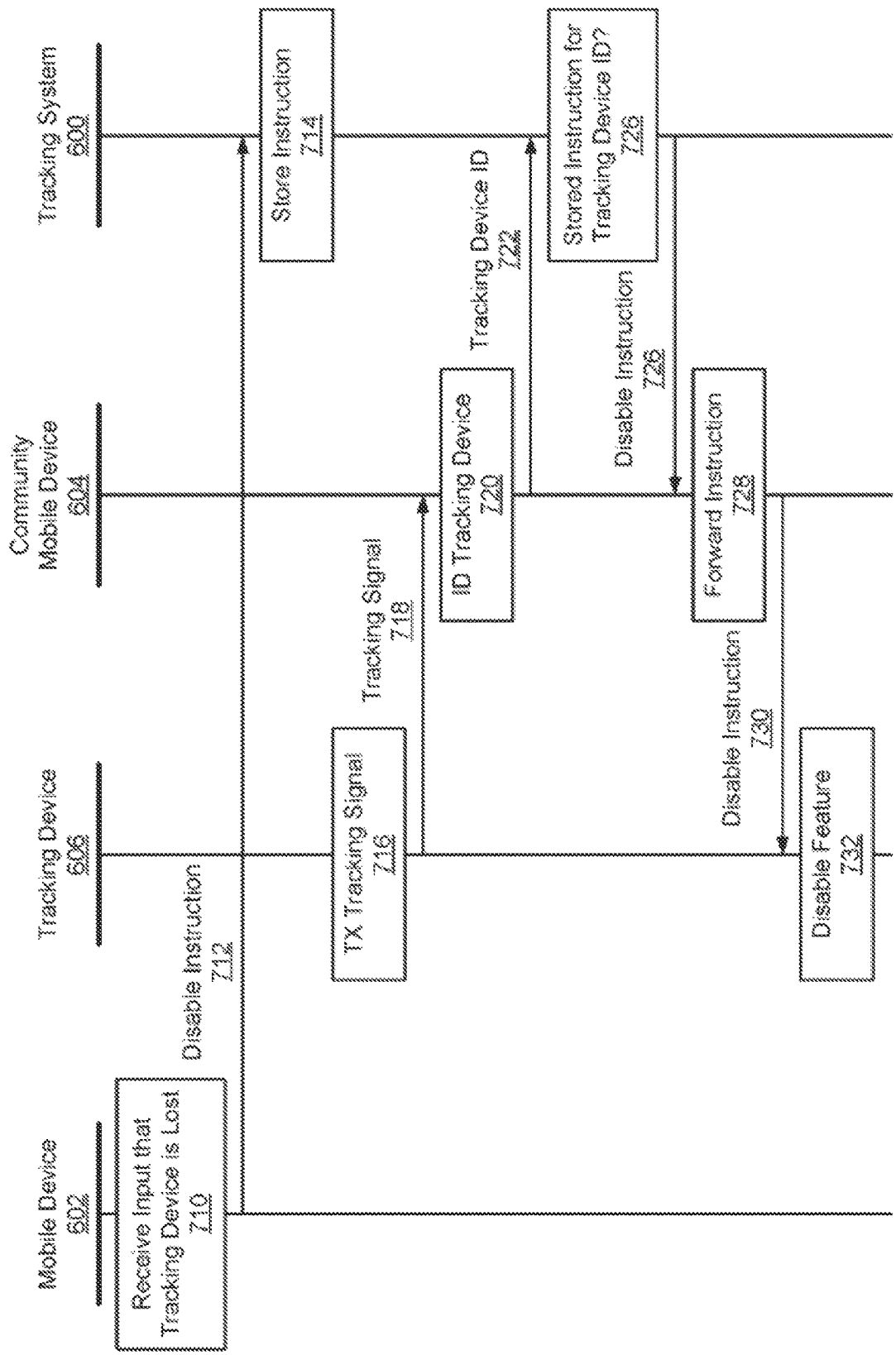
FIG. 7 is an interaction diagram illustrating a process for disabling a feature of a tracking device based on an instruction from a mobile device, according to one embodiment.

FIG. 7 is an interaction diagram illustrating an exemplary process for disabling a feature of a tracking device, according to one embodiment. The mobile device 602 receives 710 input that the tracking device 606 is lost. The input can be received from a user of the mobile device 602, e.g., if the user believes that tracking device 606 was left in a public place. As mentioned above, alternatively, the mobile device 602 may automatically determine that a tracking device 606 is lost. The input may also include an explicit request to disable the tracking device 606 or some feature(s) of the tracking device 606, as discussed above with respect to FIG. 6.

In response to the input that the tracking device 606 is lost, the mobile device 602 transmits a disable instruction 712 to the tracking system 600. The tracking system 600 stores 714 the disable instruction received from the mobile device 602.

The lost tracking device 606 transmits 716 a tracking signal 718. For example, the tracking device 606 may transmit a beacon signal at regular intervals; the tracking signal may be transmitted whether or not the tracking device 606 is lost. The tracking signal 718 is detected by the community mobile device 604, which is presently within the communications range of the tracking device 606. The community mobile device 604 can extract the identity 720 of the tracking device 606 based on the received tracking signal 718. The community mobile device 604 then transmits the tracking device identifier 722 of the tracking device 606 to the tracking system 600. In some embodiments, the community mobile device 604 may have previously received a notification from the tracking system 600 that the tracking device 606 was marked as lost.

After receiving the tracking device ID 722 from the community mobile device 604, the tracking system 600 determines that the tracking device ID 722 matches the tracking device 606 for which the disable instruction 712 is stored. The tracking system 600 then transmits the disable instruction 726 to the community mobile device 604, which forwards 728 the disable instruction 730 to the tracking device 606. In response to the disable instruction 730, the tracking device 606 disables 732 the feature(s) specified by the disable instruction 730. The tracking device 606 may transmit to the community mobile device 604 a confirmation (not shown in FIG. 6) that the disable instruction 730 was received and/or that the feature(s) have been disabled. The community mobile device 604 may forward the confirmation to the tracking system 600, which may in turn forward the confirmation to the mobile device 602.

As discussed with respect to FIG. 6, the precise instructions for disabling the tracking device 606 may be stored at the tracking system 600. In this case, instead of transmitting a disable instruction 712, the mobile device 602 simply transmits a lost indication to the tracking server 600. In response, the tracking system 600 sets a lost flag and retrieves disabling instructions for the tracking device 606, which the tracking system 600 forwards to the tracking device 606 via the community mobile device 604.

Figure 8:
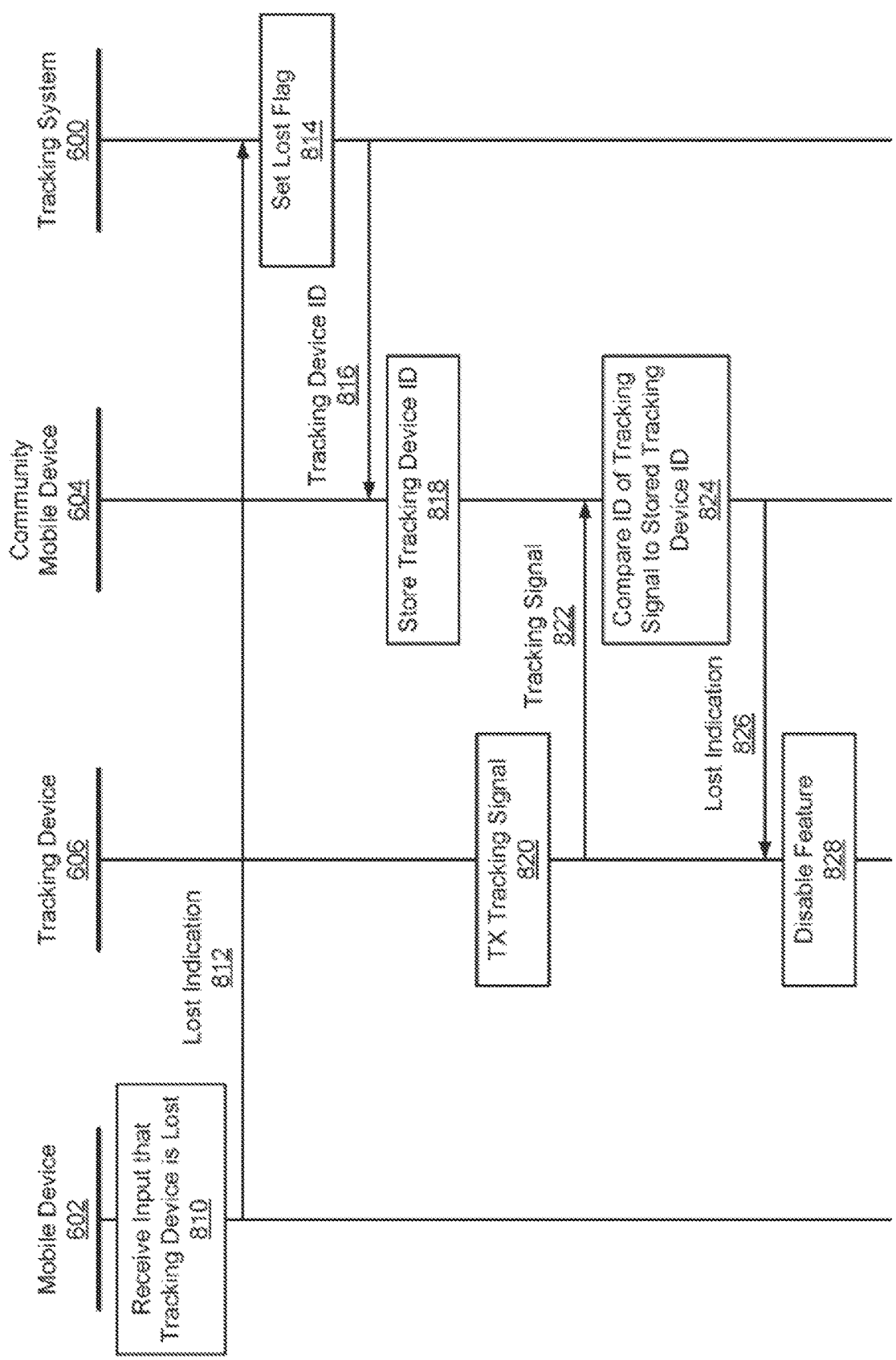
FIG. 8 is an interaction diagram illustrating a process for disabling a feature of a tracking device based on instructions stored on the tracking device, according to one embodiment.

Alternatively, as discussed with respect to FIG. 6, the instructions for disabling the tracking device 606 may be stored at the tracking device 606. As an example, the disable instructions 712, 726, and 730 may be replaced by lost indications; when the tracking device 606 receives the indication that it is lost, it automatically disables one or more features according to its stored disabling instructions. FIG. 8 is an interaction diagram illustrating another exemplary process for disabling a feature of a tracking device based on instructions stored on the tracking device.

The mobile device 602 receives 810 input that the tracking device 606 is lost. The input can be received from a user of the mobile device 602, or the mobile device 602 may automatically determine that the tracking device 606 is lost. In response to the input that the tracking device 606 is lost, the mobile device 602 transmits a lost indication 812 to the tracking system 600. The tracking system 600 sets 814 a lost flag based on the lost indication 812. The tracking system 600 also transmits a tracking device identifier 816 of the lost tracking device 606 to one or more community mobile devices, including community mobile device 604. The community mobile device 604 stores 818 the received tracking device ID so that the community mobile device 604 can scan for nearby tracking devices and identify whether any nearby tracking devices have been marked as lost.

The lost tracking device 606 transmits 820 a tracking signal 822. For example, the tracking device 606 may transmit a beacon signal at regular intervals; the tracking signal may be transmitted whether or not the tracking device 606 is lost. The tracking signal 822 is detected by the community mobile device 604, which is presently within the communications range of the tracking device 606. The community mobile device 604 can extract the identity of the tracking device 606 based on the received tracking signal 822, and compare 824 the ID of the tracking device 606 included in the tracking signal to the stored tracking device ID. If the community mobile device 604 determines that the ID of the tracking device 606 matches the ID of the tracking device flagged as lost at the tracking system 600, the community mobile device 604 transmits a lost indication 826 to the tracking device 606. This lost indication 826 alerts the tracking device 606 that it has been marked as lost.

In response to the lost indication 826, the tracking device 606 disables 828 one or more features based on instructions stored at the tracking device 606. The tracking device 606 may transmit to the community mobile device 604 a confirmation (not shown in FIG. 6) that the feature(s) have been disabled. The community mobile device 604 may forward the confirmation to the tracking system 600, which may in turn forward the confirmation to the mobile device 602.

Figure 9:
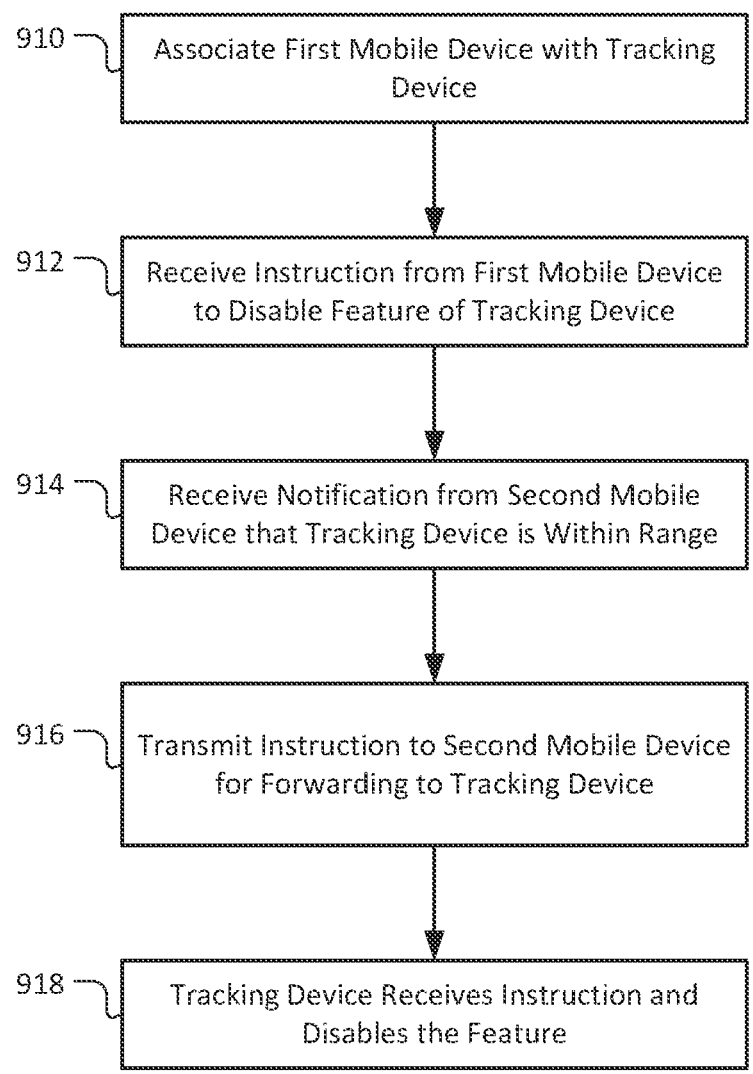
FIG. 9 is a flow chart illustrating a process for disabling a feature of a tracking device, according to one embodiment.

FIG. 9 is a flow chart illustrating a process for disabling a feature of a tracking device, according to one embodiment. In other embodiments, the process 900 may include additional steps not shown in FIG. 9, and some of the steps in the process 900 may be omitted or performed in a different order.

The tracking system 600 associates 910 a first mobile device, e.g., the mobile device 602, with a tracking device, e.g., the tracking device 606. Associating a mobile device with a tracking device at a tracking system is described in detail with respect to FIGS. 1 and 2.

The tracking system 600 receives 912 an instruction, e.g., the disable instruction 712, from the first mobile device to disable a feature of the tracking device. The tracking system 600 also receives 914 a notification from a second mobile device, e.g., the community mobile device 604, that the tracking device is within range of the second mobile device. The second mobile device may have received a beacon signal from the tracking device identifying the tracking device.

Having received both the instruction to disable the feature and the notification that the second mobile device is within range of the tracking device, the tracking system 600 transmits 916 the instruction to the second mobile device for the second mobile device to forward to the tracking device. The tracking device 606 then receives 918 the instruction to disable the feature from the second mobile device, and in response to the instruction, disables the feature.

Although steps 910-918 of FIG. 9 are described as being performed on the tracking system 600, some or all of the steps of these steps may alternatively be performed on the mobile device 602.

Remote Control of Tracking Device

Figure 10:
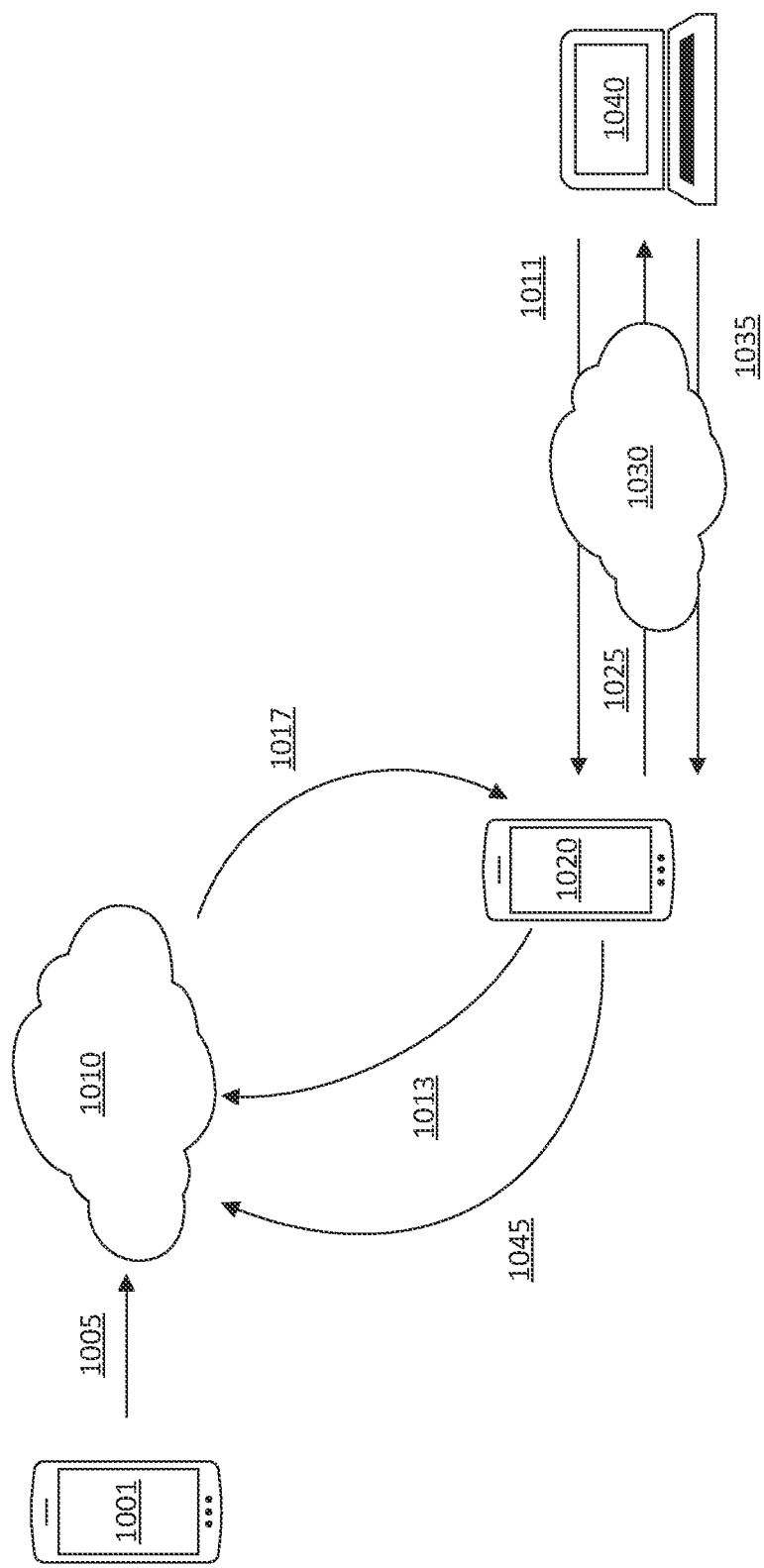
FIG. 10. illustrates an environment for providing remote instructions to a tracking device.

FIG. 10 illustrates an environment for providing for remote control of a tracking device 1040 and/or any other device embodying tracking functionality as described herein, according to one embodiment. The environment includes a tracking system 1010, a user mobile device 1001 associated with the tracking device 1040, a community mobile device 1020, and a network 1030. The tracking system 1010, user mobile device 1001 associated with the tracking device 1040, community mobile device 1020, and networks may be similar to the tracking system 100, mobile device 102, community mobile device 104, and first network 108 and second network 110 described with respect to FIGS. 1 through 4. The tracking system 1010 can associate the user mobile device 1001 and/or a user of the mobile device 1001 with the tracking device 1040, e.g., using an association manager, as described above with respect to FIGS. 1 and 2.

Each of the user mobile device 1001, community mobile device 1020, and tracking device 1040 may be embodied in the form of a mobile device or may be embodied in any other computing device configured to communicate with a tracking system 1010. Throughout this discussion, the user mobile device 1001 may also be referred to as a user computing device 1001, the community mobile device 1020 may also be referred to as a computing device 1020, the tracking device 1040 may be referred to as a lost device 1040 (even though, as described below, the applicability of the techniques described herein is not limited to a device that is lost), and the tracking system 1010 may be referred to as a tracking system server.

In the embodiment shown in FIG. 10, the tracking device 1040 is not necessarily a dedicated tracking device—instead, it may be a device configured to perform one or more primary device features, and also includes tracking features. As discussed above, a tracking device can include one or more primary functions and secondary tracking device functions. The tracking features may be implemented by some or all of the components of the tracking device 106 described with respect to FIG. 5. The tracking device 1040 can include one or more functional components configured to implement the primary device features, which are not necessarily related to tracking of the tracking device 1040.

As an example, the tracking device 1040 may be a laptop computer with primary device features including receiving input from users through one or more interactive interfaces or input sources, displaying output via a display screen of the laptop computer, accessing and managing data on the device, receiving communication input from other devices (e.g., via a Wi-Fi communication network, a Bluetooth signal), etc. The laptop computer can also include tracking features that allow a user to track and/or locate the laptop computer using the tracking system. Certain components of the laptop computer may be used to implement both the tracking features and the one or more of the primary device features. Continuing the above example, a Bluetooth communications interface of the laptop computer may be used both to connect to other computing devices and to transmit beacon signals used to locate the laptop computer.

In particular embodiments, the tracking features may be implemented using a tracking device platform. For example, a tracking device provider can provide a software development kit (SDK) or custom chipset that, when incorporated into the tracking device 1040 (or incorporated into a computing device generally), enable the tracking features. This allows nearly any computing device to function as a tracking device within the tracking system, e.g., by communicating with other devices within the tracking device ecosystem and responding to tracking-related commands from devices within the tracking device ecosystem. If the tracking features are integrated into the tracking device 1040 using an SDK, the tracking device 1040 may not have any special-purpose hardware included for the tracking component. In other embodiments, one or more hardware components, such as a communications interface or motion sensors, may be included in the tracking device 1040 to enable the tracking features, e.g., if these components are not used to implement the primary device features.

As described further below, the tracking features may also include a feature for receiving instructions for one or more of the primary device features and implementing the received instructions using the primary device features in the tracking device 1040. For example, the tracking features may be implemented by one or more components for transmitting a tracking signal (e.g., a beacon signal), receiving an instruction related to one or more primary device features, and transmitting the received instructions to a component for implementing the primary device features.

The environment shown in FIG. 10 supports a wide range of features for interacting remotely with the tracking devices, such as tracking device 1040. In particular embodiments, if the tracking device 1040 is lost, the user computing device 1001, tracking system 1010, and community computing device 1020 can interact with each other and with the tracking device 1040 to set a status for the tracking device 1040 in the tracking system 1010 as lost and locate the tracking device 1040 as described with respect to FIGS. 1-4. In particular embodiments, a user using the user computing device 1001 may issue remote commands to a remote tracking device 1040, even when the user computing device 1001 is not within direct communication range of the tracking device 1040. For example, the tracking system 1010 may transmit an instruction to the tracking device 1040, via the community mobile device 1020 and network 1030, relating to one or more features of the tracking device 1040.

In particular embodiments, the user computing device 1001 may transmit instructions relating to remote operation of a tracking device 1040 relating to functions of one or more features of the tracking device 1040. The features for which the instructions are sent may be related to the tracking functions of the tracking device 1040 but may also be related to the primary (e.g., non-tracking) functions of the tracking device. The instructions may encompass a variety of operations depending on the primary functions made available by the tracking device 1040. As an example only, and not by way of limitation, the instructions may include instructions to cause particular actions to occur, enable a feature, disable a feature, send a message, alter or cause an output of the tracking device (e.g., via a speaker, display screen, haptic device, etc.), modify or delete data stored by the tracking device 1040, update software or firmware installed on the tracking device 1040, change one or more settings of the tracking device 1040. The user computing device 1001 may transmit instructions upon request of a user of the user computing device 1001 (e.g., in response to input provided by a user via an interactable user interface of the user computing device 1001) or automatically in response to determining that a particular condition has been satisfied. Conditions may include the tracking device 1040 being determined to be lost, a time elapsed since a previous communication signal was received from the tracking device exceeding a threshold amount of time, time of day, date, etc. Particular embodiments will be described involving the tracking device 1040 being "lost" (e.g., the precise location of the tracking device 1040 being unknown to the user computing device 1001 or tracking system 1010), however, persons of skill in the art would understand that the same techniques described herein are applicable to any scenario in which a sufficiently configured tracking device 1040 is outside of the communication range of a user computing device 1040, but within range of communication with another computing device 1020 that is also in communication with a tracking system 1010 with which the user computing device 1001 is communicating.

In one embodiment, the user computing device 1001 transmits an instruction relating a feature of the tracking device 1040 if, for example, the user of the user computing device 1001 believes that the tracking device 1040 has been stolen, or is at risk of being stolen (e.g., if the user left the tracking device 1040 in a public place). In particular embodiments, the instruction may be an instruction to disable all primary device features, tracking features, all primary and tracking features, or a single identified feature or subset of features. The instruction may depend on the abilities of the tracking device 1040. For example, if the tracking device 1040 is a wireless speaker or wireless headphones, the instruction may relate to the ability of the tracking device 1040 to pair (e.g., via a Bluetooth connection) with an arbitrary second device. Even if forming a Bluetooth connection is disabled, the tracking device 1040 may still be able to use the Bluetooth communications interface of the tracking device 1040 for the tracking features, e.g., to transmit beacon signals or receive instructions from another computing device that is in communication with the tracking system 1010. As another example, if the tracking device 1040 is an electronic key for a car, the instruction may be to disable all primary device features, e.g., features for locking, unlocking, opening the trunk, setting off the panic button, or starting the car. This would prevent a potential thief from finding or gaining access to the car.

In another embodiment, the user computing device 1001 may transmit another instruction relating to a primary device feature of the tracking device 1040 in response to determining that the tracking device 1040 is lost, stolen, or at risk of being stolen. Continuing the example above of the wireless speaker, the instruction may comprise an instruction to output a particular sound using the speaker components of the wireless speaker. The sound may then be used by the user of the user computing device 1001 or another user in the community of users who engage with the tracking system 1010 to identify and locate the wireless speaker. As another example, if the tracking device 1040 is a laptop computer, the instruction may include a series of instructions to lock the laptop computer and require an additional layer of security (e.g., an additional security challenge) to be satisfied to unlock the laptop computer or else all data stored by the laptop computer will be erased.

In particular embodiments, the primary device features of the tracking device do not need to be activated or powered-on for the instructions to be delivered using the techniques described here. The instructions may be stored by an always-on tracking component of the tracking device 1040 and used by the one or more primary features once the tracking device 1040 is reactivated. Thus, in the example of the laptop computer, the instructions may prevent an unauthorized user from entering the laptop computer to review data even if the laptop was not powered-on when the device was misplaced, and the instructions were sent from the user computing device 1001.

In different embodiments, the instructions can be sent from or stored at the user computing device 1001, the tracking system 1010, one or more other computing devices 1020, or the tracking device 1040. In one embodiment, the user computing device 1001 is configured to receive an explicit instruction from the user of the user computing device relating to an identified feature or set of features. In another embodiment, the user computing device 1001 may generate an instruction in response to receiving an indication from the user that the tracking device 1040 is lost. In this case, one or more parameters of the instruction (e.g., which feature(s) to which the instructions relate, conditions for transmitting the instruction) may be locally stored on the user computing device 1001 and configured by the user.

In another embodiment, the tracking system 1010 stores instructions for a tracking device 1040. When the user sets up the tracking features of the tracking device 1040, the user may have the option to provide one or more rules for sending instructions to the tracking device 1040 relating to one or more features that are administered by the tracking system 1040, e.g., send a set of instructions relating to one or more primary device features whenever the tracking device 1040 is marked as lost, send a set of instructions relating to one or more primary device features if the tracking device 1040 is lost and determined to located in a public place, send a set of instructions relating to one or more primary device features (e.g., disable all device features) if the tracking device 1040 is more than a threshold distance away from the user computing device 1001, etc. In other embodiments, one or more rules for disabling the tracking device 1040 may be set by the tracking system 1040 or may be provided to the tracking system 1040 by the manufacturer of the tracking device 1040.

In particular embodiments, other computing devices 1020 (e.g., computing device not associated with the user or the user computing device 1001) that engage with the tracking system 1010 may store instructions relating to primary device features of one or tracking device 1040. The other computing devices 1020 may provide the instructions to the tracking device 1040 upon receiving a communication signal (e.g., a tracking signal) from the tracking device 1040 and identifying the tracking device 1040 as a lost tracking device for which the other computing device 1040 is storing instructions.

In yet another embodiment, the tracking device 1040 stores instructions to disable itself if it is lost, e.g., in response to receiving a notification from another computing device 1020 that it is lost, or in response to determining that the tracking device 1040 is no longer within a communication range of the user computing device 1001, or in response to determining that the tracking device has not received a communication signal from any computing device associated with the tracking system 1020 for an amount of time (e.g., time elapsed) exceeding a threshold amount of time. These instructions may be provided by the user (e.g., when configuring the tracking device 1040 directly or with the user computing device 1001), by the tracking system 1010, or by the manufacturer of the tracking device 1040.

In some cases, the tracking device 1040 only includes tracking features, i.e., the primary function of the tracking device 1040 is for tracking. In such embodiments, the tracking features can be modified and/or disabled according to instructions provided by the user computing device 1001 or set at the tracking system 1010 or tracking device 1040. In this case, disabling the tracking device 1040 can prevent an unauthorized user from stealing and repurposing the tracking device 1040 to track an item belonging to the unauthorized user.

In some embodiments, instructions for the tracking device 1040 may be sent and delivered in stages. As an example, instructions relating to a first portion of the primary device features may be initially sent, for example, when a user first recognizes that the tracking device 1040 is lost. As an example, instructions may be sent to lock a laptop computer and require additional security challenges to be satisfied to unlock the laptop computer. If, for example, a preset amount of time passes, additional instructions relating to additional features may be automatically sent by the tracking system 1010 or may be recommended to be sent by the user. Continuing the previous example, after a certain period of time without locating the laptop computer the user may be recommended to send instructions to delete sensitive data stored by the laptop computer. Additional instructions may be sent if a user flags a tracking device 1040 as permanently lost through interaction with the user computing device 1001. Continuing the above example, the user may flag the laptop computer as permanently lost and send instructions to cause all data on the laptop computer not related to tracking features to be deleted. The instructions sent and features for which instructions are sent may be customized and grouped by the user through a customizing interface of the user computing device 1001, may be grouped by the tracking system 1010, or may be established by an administrator or manufacturer of the tracking device 1040.

In particular embodiments, the tracking device 1040 receives the instructions, performs operations relating to the instructions, and conveys an acknowledgement of the instructions back to the user computing device 1001. For example, the tracking system 1010 may relay the instructions to one or more other computing devices 1020 that communicate with the tracking system 1010. The other computing devices may communicate with the tracking device 1040 via a network 1030 and send the instructions to the tracking device 1040. The tracking device may send an acknowledgement of the instructions and/or a confirmation that the instructions have been effected to the other computing device 1020 via the network 1030. The other computing devices 1020 may forward or resend the acknowledge received from the tracking device 1040 back to the tracking system 1010. The tracking system 1010 may then send the acknowledgement back to the user computing device 1001. Thus, the system described herein may enable remote management and control of tracking devices 1040 (or, more generally, devices that have been configured to interface with a tracking system 1010) by a user computing device 1001 (or other computing device with sufficient privileges, such as an administrator of a network of device using the tracking system 1010).

Figure 11:
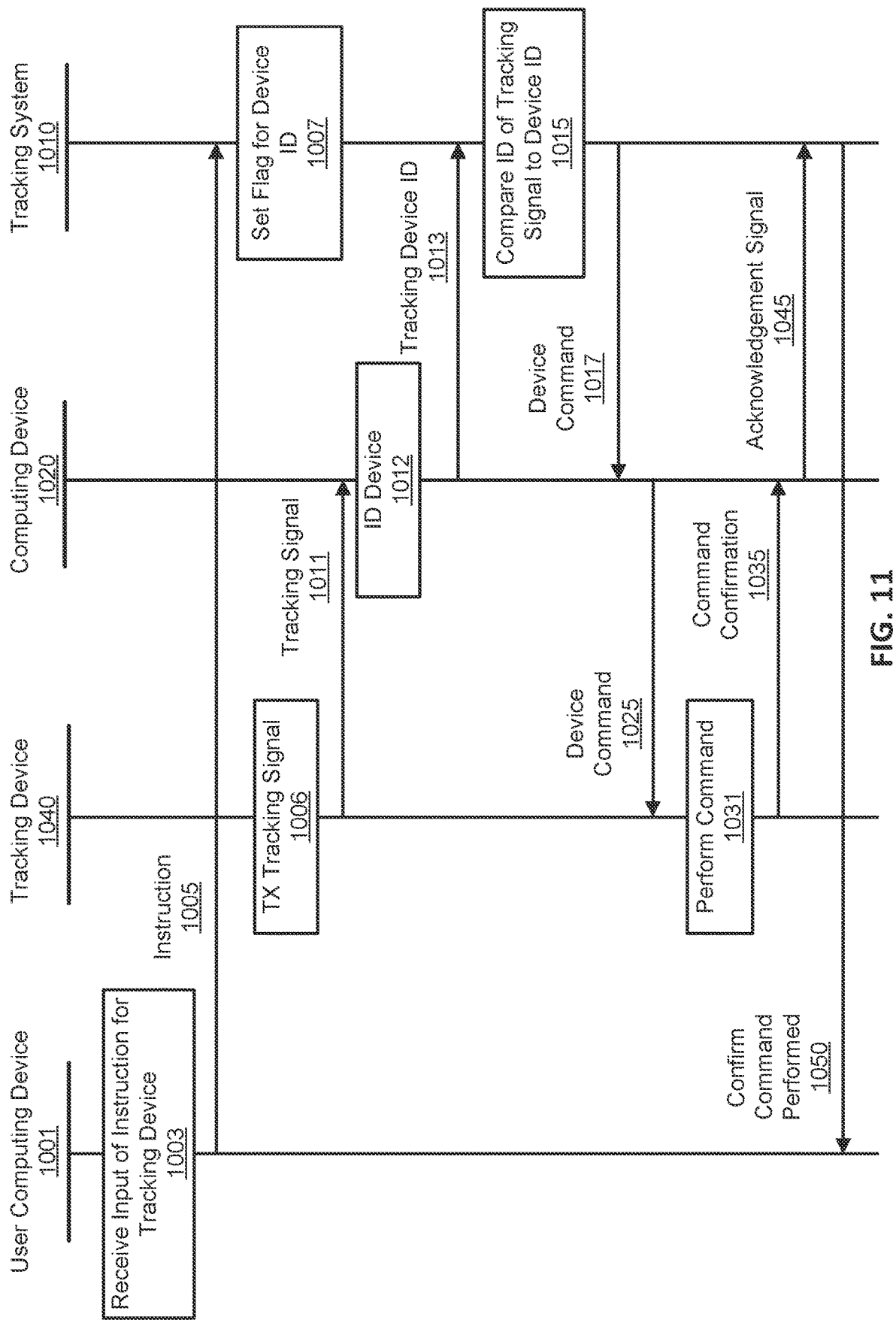
FIG. 11 is an interaction diagram illustrating a process for remotely performing a command on a tracking device based on an instruction from a user computing device, according to one embodiment.

FIG. 11 is an interaction diagram illustrating an exemplary process for process for remotely performing a command on a tracking device based on an instruction from a user computing device, according to one embodiment. At step 1003, the user computing device 1001 receives input of an instruction for a tracking device 1040 from a user of the user computing device 1001. The instruction may be received through an interactive user interface provided by an application associated with the tracking system 1010 executing on the user computing device 1001. The instruction may be received through communication with another device used by the user of the user computing device. For example, the user may send the instruction to the user computing device through a peripheral device such as a tracking device, smartwatch, etc. The instruction may include context associated with the instruction, such as an indication that the tracking device has been lost. In some embodiments, the instruction may be automatically generated on behalf of the user after one or more conditions have been satisfied. For example, the instruction may be generated automatically (and may optionally be confirmed by the user) if the user computing device 1001 has not communicated with a tracking device 1040 for more than a threshold period of time In response to receiving the input of the instruction for the tracking device that the tracking device 1040, the user computing device 1001 transmits the instruction 1005 to the tracking system 1010. In particular embodiments, the user computing device 1001 may reformat the instruction to be more suitable to send to the tracking system 1010. For example, the user computing device 1001 may encoded the instruction in a message for the tracking system 1010. The user computing device 1001 may augment the instruction 1005 with additional context information that may be useful in ensuring that the instruction can be delivered to the tracking device 1040. For example, the instruction 1005 may be encoded with a device identification for the tracking device, a time or location of last contact with the tracking device, and any other suitable information. The device identification for the tracking device may be, for example, a universally unique identifier (UUID), a globally unique identifier (GUID), a unique identifier (UID) established by the tracking system or the manufacturer of the tracking device, or other suitable identifier.

At step 1007, the tracking system 1010 receives the instruction message, decodes it if needed, and retrieves the instruction and associated contextual information. The tracking system 1010 associates the instruction with the pending instruction and sets a status for the tracking device 1040 indicating that the tracking device 1010 has a pending instruction. For example, the tracking system may maintain one or more databases for storing data regarding tracking devices, associated user computing devices, and associated users. The tracking system 1010 may update one or more of the records of the database to modify a status associated with the tracking device to, e.g., flag the tracking device 1040 as having a pending instruction. The tracking system 1010 may update the records of the database to include the instruction and other associated contextual information, such as the feature for which the instruction is pending, the identity of the user who issued the pending instruction, etc.

At step 1006, which may occur before, during, or after step 1007, the tracking device 1040 transmits 1006 a tracking signal 1011. For example, the tracking device 1040 may transmit a beacon signal at regular intervals. The tracking signal may be transmitted by the tracking device 1040 whether or not the tracking device 1040 is lost as part of the regular operations of the tracking device 1040 attempting to interface with the tracking system. The tracking signal 1011 is detected by a computing device 1020 associated with the tracking system 1040 other than the user computing device 1001. The computing device 1020 may be presently within the communications range of the tracking device 1040.

At step 1012, the computing device 1020 can identify the tracking device based on the received tracking signal 1011. For example, the tracking signal 1011 may be encoded with a unique device identification for the tracking device 1040. The computing device 1020 may have previously communicated with the tracking device 1040 and may identify the tracking device 1040 by looking up an identifier sent with the tracking signal 1011 to determine the tracking device 1040 identification in data storage stored by the computing device 1020. The computing device 1020 then transmits the tracking device identifier 1013 of the tracking device 1040 to the tracking system 1010. In some embodiments, as discussed in further detail below the computing device 1020 may have previously received a notification from the tracking system 1010 that the tracking device 1040 was marked as lost or has a pending instruction.

Continuing with the flow diagram shown in FIG. 11, at step 1015, after receiving the tracking device ID 1013 from the computing device 1020, the tracking system 1010 compares the tracking device ID received by the computing device 1020 with the tracking signal 1011 to the device ID received or identified based on the instruction 1005 for the tracking device 1040 received from the user computing device 1001. The tracking system may determine that the tracking device ID 1013 matches the identification for the tracking device 1040 for which the instruction 1005 was received. The tracking system 1010 may query its database records using the received tracking device ID to determine whether any pending instructions exist for the tracking device 1040 and whether there are any status flags set for the tracking device. The tracking system 1010 may identify the instruction 1005 received from the user computing device and generate a device command 1017 for the tracking device 1040 based on the instruction. The tracking system 1010 then transmits the device command 1017 to the computing device 1020.

The computing device 1020 then forwards the device command 1030 to the tracking device 1040 via the network 1030. In particular embodiments, the computing device 1020 may receive the device command 1017 intended for the tracking device 1040 and may regenerate a new device command 1025 based on the received device command 1017. For example, the format of the device command 1017 received from the tracking system 1010 may be inappropriate or less efficient for the computing device 1020 to use to send to the tracking device 1040. As another example, the device command 1017 from the tracking system 1010 may contain the device command 1025 for the tracking device 1020, so the computing device 1020 may need to extract the device command 1025 for the tracking device 1020 from the device command received from the tracking system 1010. The computing device 1020 may send the device command 1025 to the tracking device 1040 using any suitable communicating protocol. For example, if the tracking device 1040 supports communication sessions, the computing device 1020 may establish a communication session with the tracking device upon receiving the tracking signal 1011 from the tracking device 1040. The computing device 1020 may then send the device command 1025 to the tracking device 1040 on that session. The computing device 1020 may also need to reestablish the communication session if the communication session ended prior to the computing device 1020 receiving the device command 1017 from the tracking system 1010.

In particular embodiments, the information for communicating on a communication session established by the tracking system 1040 may be predetermined by the tracking system and passed to the various devices communicating within the tracking system. For example, the tracking device 1040, user computing device 1001, other computing device 1020, and tracking system 1010 may have been associated by a device manufacturer with a key for establishing or accessing a communication session or channel at time of manufacture. The key for establishing or accessing a communication session or channel may rotate according to a secured pattern. Such a system may enable the devices to instantly establish a secured communication session or channel without a need to send any potentially identifiable or private information in an unencrypted or unencoded format. Thus, the devices may reduce the risk of an unauthorized user tracking the location of any of the devices or issuing unauthorized commands to the devices.

In other embodiments, the tracking device 1040 and computing device 1020 may communicate using beacon signals. The computing device 1020 may encode and/or encrypt the device command 1025 for the tracking device 1040 and broadcast a beacon signal with the device command. Other methods of the tracking device 1040 and computing device 1020 are envisioned and may be used.

The tracking device 1040 may receive the device command 1025 from the computing device 1020. In particular embodiments, the tracking device 1040 may send a response to the computing device 1020 acknowledging receipt of the device command 1025. At step 1031, the tracking device 1040 may perform the command relating to one or more features of the tracking device 1040 using the one or more features indicated by the command. For example, if the tracking device 1040 is or is embodied in a laptop computer and the command was to lock the laptop computer and require additional security challenged to unlock the laptop computer, the tracking components of the laptop computer (e.g., hardware components, software components, a periphery component included with the laptop computer) may pass the instructions to a central processor of the laptop computer or other relevant component for the command to be performed. If the command is able to be performed, the tracking components may send a confirmation 1035 that the command was performed back to the computing device. If, for some reason, the command cannot be performed, a message may be sent to the computing device 1020 indicating that the command was received but not performed and may indicate the reason why the command 1025 could not be performed.

The computing device 1020 may receive the command confirmation (or command failure notice) from the tracking device 1040. The computing device 1020 may then send an acknowledgement 1045 to the tracking system indicating that the device command 1017 was performed by the tracking device 1040 in response to the instructions send by the computing device 1020 to the tracking device 1040. In particular embodiments, the computing device may send additional device commands pending in a queue of device commands for the tracking device 1040. The computing device 1020 may preferably wait until it has received confirmation of each separate command being performed before the subsequent command is sent. Relatedly, the acknowledgement 1045 sent to the tracking system 1040 may only be sent once all commands have been sent and performed. The computing device 1020 may also send any failure messages or, as described below, may send a notification that the computing device 1020 was not able to send the instructions to the tracking device 1040 (for example, because the tracking device 1040 left the communication range of the computing device 1020 or because the tracking device 1040 lost power). The tracking system 1010 may send an update 1050 to the user computing device 1001 regarding the status of the device command. If the command was successful, the tracking system's update 1050 may indicate that the command was successfully performed by the tracking device 1040. The update may also include a new, most recent location associated with the tracking device 1040 determined by the computing device 1020 based in part on the location of the computing device 1020. The user computing device 1001 may display the update to the user of the user computing device 1001 to update the user of the status of their tracking device 1040 and instruction therefor.

Figure 12:
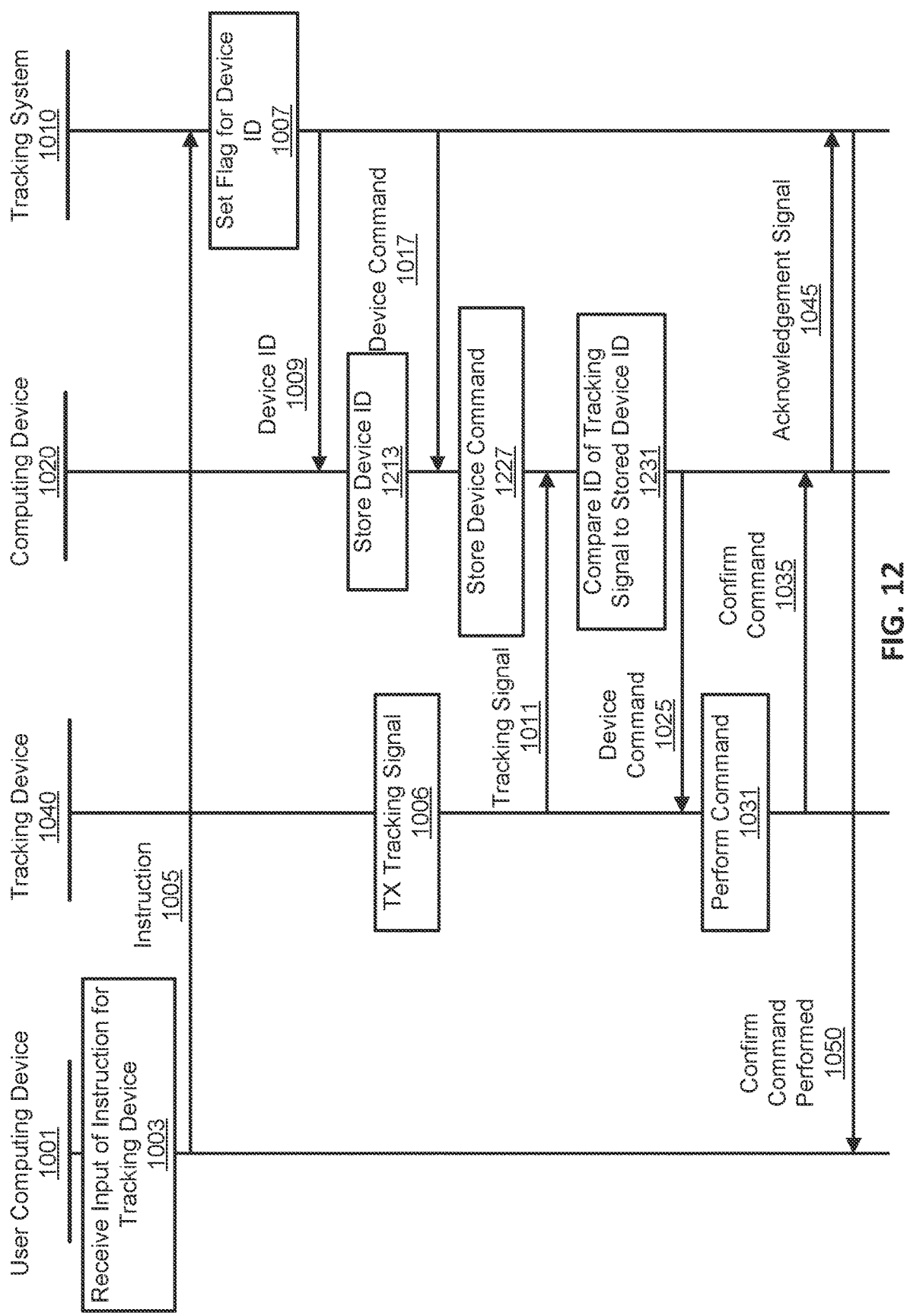
FIG. 12 is an interaction diagram illustrating a process for remotely performing a command on a tracking device based on an instruction from a user computing device, according to one embodiment.

FIG. 12 is an interaction diagram illustrating another exemplary process for remotely performing a command on a tracking device based on an instruction from a user computing device. In the embodiment shown in FIG. 12, computing device 1020 stores a device ID 1009 and device command 1017 for the tracking device 1040 and sends the device command 1025 to the tracking device 1040 after determining that the tracking device 1040 is associated with a pending instruction. The embodiment shown in FIG. 11 differs from that shown in FIG. 12 at least because in FIG. 11 the determination of whether a tracking device 1040 is associated with a pending instruction is performed by the tracking system 1010 prior to sending the device command 1017 to the computing device 1020. The computing device 1020 may periodically scan the nearby environment looking for tracking devices 1040. The computing device 1020 may also be configured to received beacon signals from nearby tracking device 1040 that enable the computing device 1020 to identify the tracking devices as discussed below.

At step 1003, the user computing device 1001 receives input of an instruction for a tracking device 1040 from a user of the user computing device 1001. The instruction may be received through an interactive user interface provided by an application associated with the tracking system 1010 executing on the user computing device 1001. The instruction may be received through communication with another device used by the user of the user computing device. For example, the user may send the instruction to the user computing device through a peripheral device such as a tracking device, smartwatch, etc. The instruction may include context associated with the instruction, such as an indication that the tracking device has been lost. In some embodiments, the instruction may be automatically generated on behalf of the user after one or more conditions have been satisfied. For example, the instruction may be generated automatically (and may optionally be confirmed by the user) if the user computing device 1001 has not communicated with a tracking device 1040 for more than a threshold period of time In response to receiving the input of the instruction for the tracking device that the tracking device 1040, the user computing device 1001 transmits the instruction 1005 to the tracking system 1010. In particular embodiments, the user computing device 1001 may reformat the instruction to be more suitable to send to the tracking system 1010. For example, the user computing device 1001 may encode the instruction in a message for the tracking system 1010. The user computing device 1001 may augment the instruction 1005 with additional context information that may be useful in ensuring that the instruction can be delivered to the tracking device 1040. For example, the instruction 1005 may be encoded with a device identification for the tracking device, a time or location of last contact with the tracking device, and any other suitable information.

At step 1007, the tracking system 1010 receives the instruction message, decodes it if needed, and retrieves the instruction and associated contextual information. The tracking system 1010 associates the instruction with the pending instruction and sets a status for the tracking device 1040 indicating that the tracking device 1010 has a pending instruction. For example, the tracking system may maintain one or more databases for storing data regarding tracking devices, associated user computing devices, and associated users. The tracking system 1010 may update one or more of the records of the database to modify a status associated with the tracking device to, e.g., flag the tracking device 1040 as having a pending instruction. The tracking system 1010 may update the records of the database to include the instruction and other associated contextual information, such as the feature for which the instruction is pending, the identity of the user who issued the pending instruction, etc.

The tracking system 1010 then sends the device ID 1009 for the tracking device 1040 and the device command 1017 for the tracking device 1040 to the computing device 1020. At steps 1213 and 1227 the computing device 1020 stores the device ID 1009 and device command 1017 in one or more datastores of the computing device 1020 that are associated with the tracking system 1010. For example, the computing device 1020 may be executing an application associated with the tracking system that enables the computing device 1020 to receive tracking signals, identify tracking devices based on information included in the tracking signals, and communicate with tracking devices and the tracking system 1010. The application may have reserved secure memory of the computing device 1020 that the application uses to store information about the tracking devices, such as, for example, device identification and pending instructions.

At step 1006, the tracking device 1040 transmits 1006 a tracking signal 1011. For example, the tracking device 1040 may transmit a beacon signal at regular intervals. The tracking signal may be transmitted by the tracking device 1040 whether or not the tracking device 1040 is lost as part of the regular operations of the tracking device 1040 attempting to interface with the tracking system. The tracking signal 1011 is detected by a computing device 1020 associated with the tracking system 1040 other than the user computing device 1001. The computing device 1020 may be presently within the communications range of the tracking device 1040.

At step 1231, the computing device 1020 can identify the tracking device based on the received tracking signal 1011. For example, the tracking signal 1011 may be encoded with a unique device identification for the tracking device 1040. The computing device 1020 may have previously communicated with the tracking device 1040 and may identify the tracking device 1040 by looking up an identifier sent with the tracking signal 1011 in its datastores to determine the tracking device 1040 identification in data storage stored by the computing device 1020. The computing device 1040 compares the tracking device ID received by the computing device 1020 with the tracking signal 1011 to the device ID 1009 received from the tracking system 1010. The computing device 1020 may determine a match. The computing device 1020 may query its datastores tracking device ID received with the tracking signal 1011 to determine whether any pending instructions exist for the tracking device 1040 and whether there are any status flags set for the tracking device. The computing device 1020 may identify the device command 1017 received from the tracking system 1010. The computing device 1020 may generate a device command 1025 for transmission to the tracking device 1040. The computing device 1020 then transmits the device command 1025 to the tracking device 1040. The computing device 1020 may also determine a location associated with the tracking device 1040 and send a notification to the tracking system 1010 indicating the computing device 1020 has received a communication signal (e.g., the tracking signal 1011) from the tracking device 1040 and send the device command 1017 to the tracking device 1040. The computing device 1020 may also send the location associated with the tracking device 1040 to the tracking system.

The computing device 1020 sends the device command 1025 to the tracking device 1040 via the network 1030. The computing device 1020 may send the device command 1025 to the tracking device 1040 using any suitable communicating protocol. For example, if the tracking device 1040 supports communication sessions, the computing device 1020 may establish a communication session with the tracking device upon receiving the tracking signal 1011 from the tracking device 1040. The computing device 1020 may then send the device command 1025 to the tracking device 1040 on that session. The computing device 1020 may also need to reestablish the communication session if the communication session ended prior to the computing device 1020 receiving the device command 1017 from the tracking system 1010. In other embodiments, the tracking device 1040 and computing device 1020 may communicate using beacon signals. The computing device 1020 may encode and/or encrypt the device command 1025 for the tracking device 1040 and broadcast a beacon signal with the device command. Other methods of the tracking device 1040 and computing device 1020 are envisioned and may be used.

The tracking device 1040 may receive the device command 1025 from the computing device 1020. In particular embodiments, the tracking device 1040 may send a response to the computing device 1020 acknowledging receipt of the device command 1025. At step 1031, the tracking device 1040 may perform the command relating to one or more features of the tracking device 1040 using the one or more features indicated by the command. For example, if the tracking device 1040 is or is embodied in a laptop computer and the command was to lock the laptop computer and require additional security challenged to unlock the laptop computer, the tracking components of the laptop computer (e.g., hardware components, software components, a periphery component included with the laptop computer) may pass the instructions to a central processor of the laptop computer or other relevant component for the command to be performed. If the command is able to be performed, the tracking components may send a confirmation 1035 that the command was performed back to the computing device. If, for some reason, the command cannot be performed, a message may be sent to the computing device 1020 indicating that the command was received but not performed and may indicate the reason why the command 1025 could not be performed.

The computing device 1020 may receive the command confirmation (or command failure notice) from the tracking device 1040. The computing device 1020 may then send an acknowledgement 1045 to the tracking system indicating that the device command 1017 was performed by the tracking device 1040 in response to the instructions send by the computing device 1020 to the tracking device 1040. In particular embodiments, the computing device may send additional device commands pending in a queue of device commands for the tracking device 1040. The computing device 1020 may preferably wait until it has received confirmation of each separate command being performed before the subsequent command is sent. Relatedly, the acknowledgement 1045 sent to the tracking system 1040 may only be sent once all commands have been sent and performed. The computing device 1020 may also send any failure messages or, as described below, may send a notification that the computing device 1020 was not able to send the instructions to the tracking device 1040 (for example, because the tracking device 1040 left the communication range of the computing device 1020 or because the tracking device 1040 lost power). The tracking system 1010 may send an update 1050 to the user computing device 1001 regarding the status of the device command. If the command was successful, the tracking system's update 1050 may indicate that the command was successfully performed by the tracking device 1040. The update may also include a new, most recent location associated with the tracking device 1040 determined by the computing device 1020 based in part on the location of the computing device 1020. The user computing device 1001 may display the update to the user of the user computing device 1001 to update the user of the status of their tracking device 1040 and instruction therefor.

Figure 13:
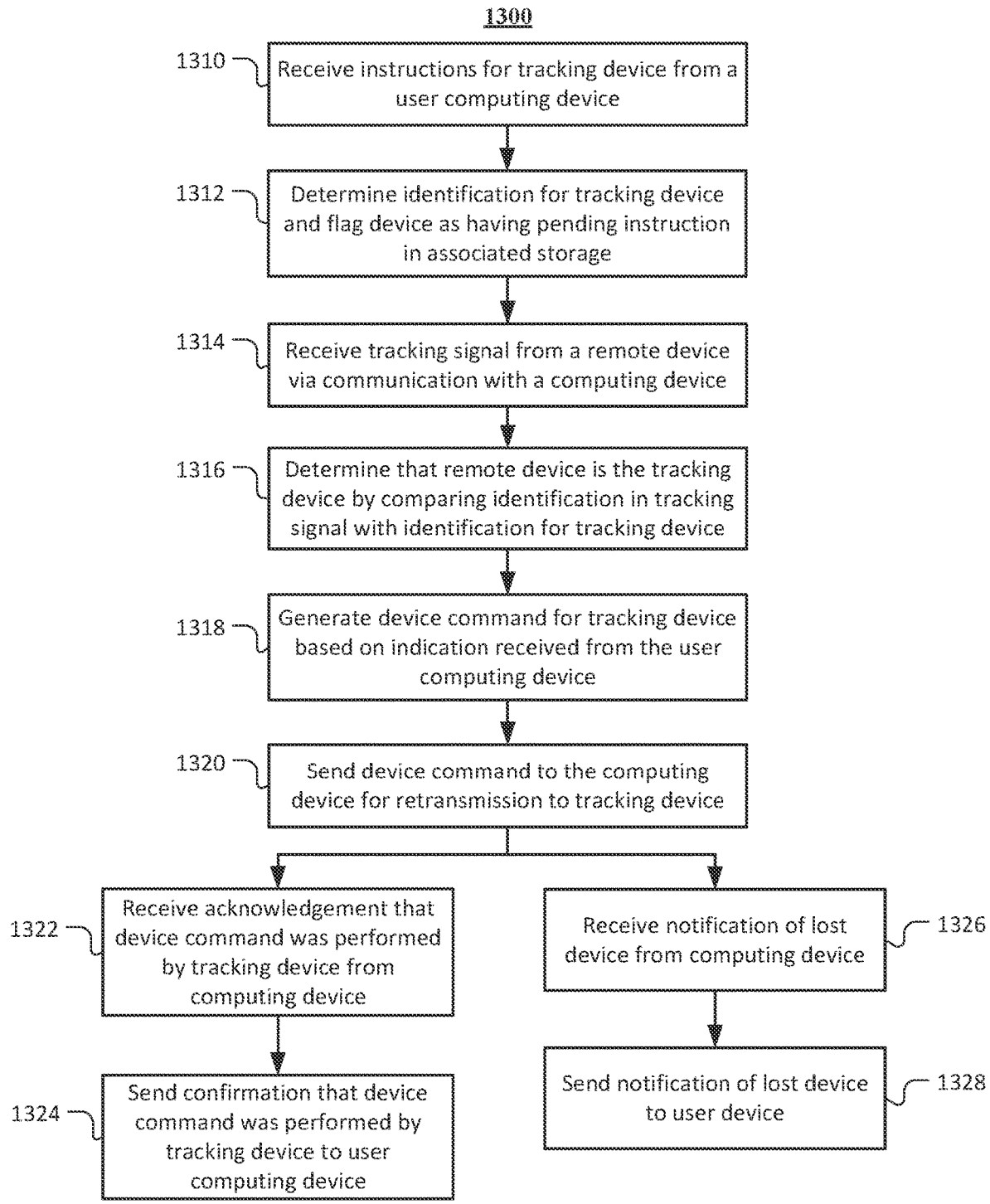
FIG. 13 is a flow chart illustrating a process for remotely performing a command on a tracking device based on an instruction from a user computing device that may be performed by a tracking system server, according to one embodiment.

FIG. 13 is a flow chart illustrating a process or method for remotely performing a command on a tracking device based on an instruction from a user computing device that may be performed by a tracking system server, according to one embodiment. In other embodiments, the method 1300 may include additional steps not shown in FIG. 13, and some of the steps in the method 1300 may be omitted or performed in a different order.

The method may begin at step 1310 where the tracking system server 1010 may receive instructions intended for a tracking device 1040 from the user computing device 1001. The tracking system server 1040 and user computing device 1001 may communication over a first communication network such as a long distance communication network. The instructions may be generated by the user computing device 1001 in response to a request from a user of the user computing device or may be generated automatically in response to, for example, a determination that the tracking device 1040 is misplaced. In particular embodiments, the tracking system server 1040 may generate the instructions itself in response to a determination that the instructions should be sent to the tracking device 1040 on behalf of the user associated with the tracking device 1040.

At step 1312, the tracking system server 1010 may determine an identification for the tracking device 1040 (e.g., a device ID) and may flag the tracking device 1040 as having a pending instruction. The tracking system server 1010 may parse, decode, and/or decrypt the instructions received from the user computing device 1001 to determine the identification for the tracking device 1040. The tracking system server 1010 may flag the tracking device, e.g., update a status associated with the tracking device ID in one or more associated data stores of the tracking system server 1010, to indicate that the tracking device 1040 has a pending instruction.

At step 1314, the tracking system server may receive a tracking signal from a remote device through communication with a computing device 1020. The tracking signal may indicate information such as a device ID associated with the remote device, a location associated with the remote device and/or a location associated with the computing device 1020. The computing device 1020 may have generated the tracking signal or received the tracking signal from the remote device. The computing device may be executing an application associated with the tracking system that enables secured communication with the tracking system server via a long-range communication network.

At step 1316, the tracking system server 1010 may determine that the remote device is the tracking device 1040 associated with a pending instruction by comparing the identification received in the tracking signal with the identification for the tracking device 1040 received or determined based on communication with the user computing device 1001. The tracking system server 1010 may query its associated databases using the device ID included in the tracking signal. The query may reveal a status associated with the device ID indicating that tracking system 1010 has a pending instruction for deployment to the tracking device 1040.

At step 1318, the tracking system server 1040 may generate a device command for the tracking device 1040 based on the indication and instructions received from the user computing device 1001. The tracking system server 1040 may identify the instruction received from the user computing device 1001 and may encode and/or encrypt the instruction in a message for the tracking device 1040.

At step 1320, the tracking system server 1040 may send the generated device command to the computing device 1020 with further instructions for the computing device 1020 to transmit the device command to the tracking device 1040 (e.g., the remote device which the computing device 1020 had been communicating with). The tracking system server 1040 may then await a response from the computing device 1020.

At step 1322, the tracking system server 1010 may receive an acknowledgement from the computing device 1020 indicating that the device command was performed by the tracking device 1040. In response to receiving the acknowledgement from the computing device 1020, the tracking system server 1040 may, at step 1324, send a confirmation to the user computing device 1001 that the device command was performed by the tracking device 1040.

At step 1326, the tracking system server 1010 may receive a notification of a lost device from the computing device 1020. The notification of a lost device may indicate that the computing device 1020 was unable to send the device command to the tracking device 1020. The tracking system server 1040 may attempt to identify additional computing devices 1020 that are in communication range of the tracking device 1040. For example, the tracking system server 1010 may search its databases for one or more computing devices 1020 that have a location near the last known location of the tracking device 1040. The tracking system server 1040 may also await further tracking signals from other computing devices 1020 indicating that they have received a communication signal from the tracking device 1040. The tracking system server may send the device command and device ID to the other identified computing devices 1020 and await a confirmation message from those devices (as in step 1322). If, after a threshold amount of time or failed attempts to send the device command to the tracking device 1040, the tracking system server 1040 may, at step 1328 send a notification to the user computing device 1328 that the tracking system server 1040 was unable to send a device command to the tracking device 1040. The notification to the user computing device 1328 may further indicate that the tracking device 1040 is currently lost to the tracking system but provide a most recent last known location.

Figure 14:
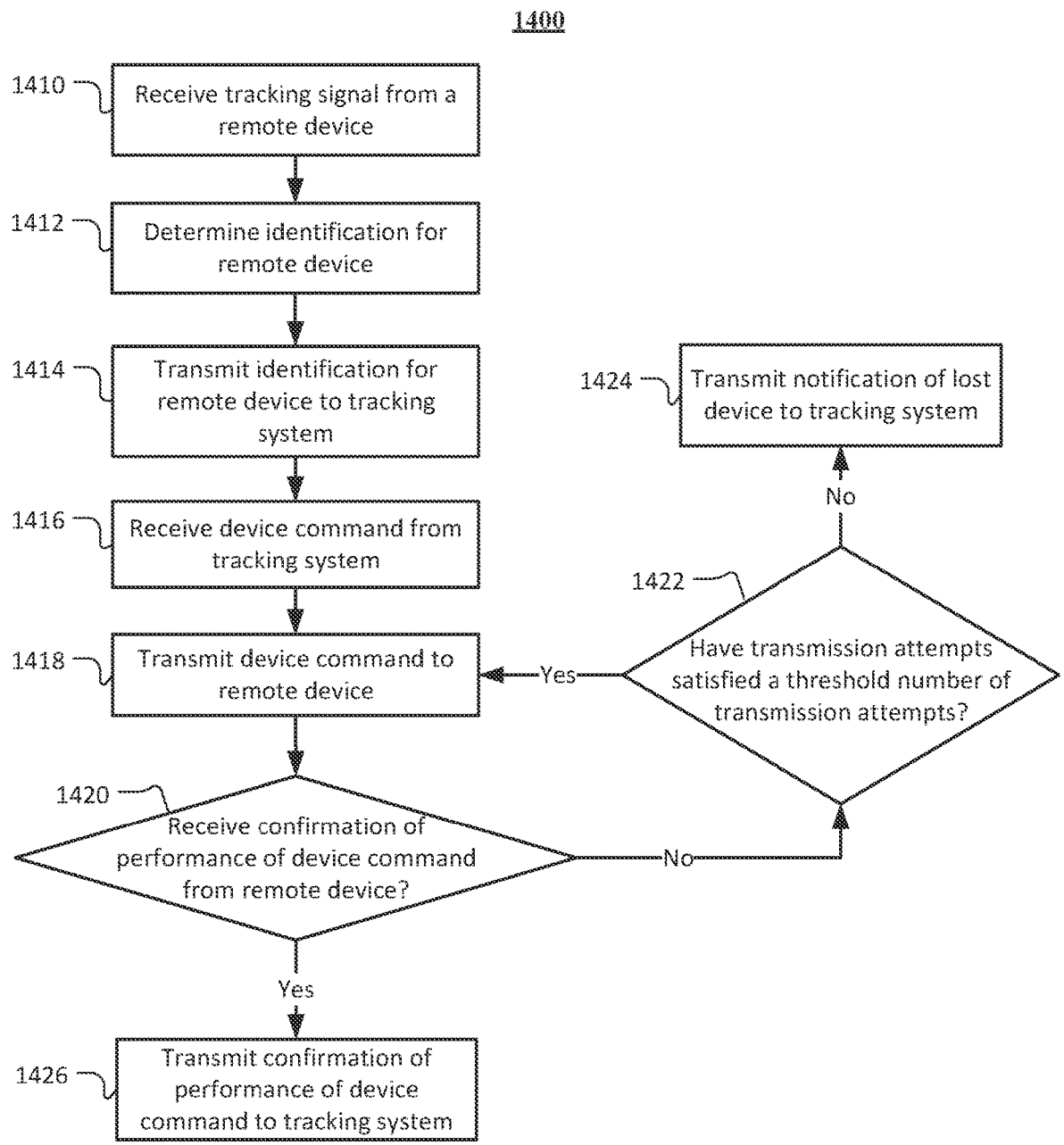
FIG. 14 is a flow chart illustrating a process for remotely performing a command on a tracking device based on an instruction from a user computing device that may be performed by a computing device, according to one embodiment.

FIG. 14 is a flow chart illustrating a process or method for remotely performing a command on a tracking device based on an instruction from a user computing device that may be performed by a computing device, according to one embodiment. In other embodiments, the method 1400 may include additional steps not shown in FIG. 14, and some of the steps in the method 1400 may be omitted or performed in a different order.

The method may begin at step 1410 where a computing device 1020 receives a tracking signal or other kind of communication signal from a remote device (e.g., a tracking device 1040). The tracking signal may be received via a communication network or protocol specializing in short-range device communications (e.g., second network 1030). The computing device 1020 may be associated with a tracking system and executing an application associated with the tracking system enabling communication with tracking devices (e.g., tracking device 1040) and a tracking system server 1010.

At step 1412, the computing device 1020 may determine an identification for the remote device. For example, the computing device 1020 may determine a device ID for the remote device, where the device ID is a unique identifier for the remote device assigned by the tracking system or a manufacturer of the remote device. The computing device 1020 may parse, decode, or decrypt the tracking signal to determine the identification. For example, the tracking signal may have the device identification embedded within it so that the computing device 1020, using the application associated with the tracking system, can easily determine the device identification.

At step 1414, the computing device 1020 may transmit the determined identification for the remote device to a tracking system server associated with the tracking system. The computing device 1020 may transmit the identification using a communication network or protocol for long-range communication (e.g., longer range than the communication network using to communicate with the remote device 1040). The computing device 1020 may be configured to transmit additional contextual information with the device identification. For example, the computing device 1020 may send a location associated with the remote device, a location of the computing device, a time associated with receiving the tracking signal, and any other parameters associated with the remote device and device identification.

At step 1416, the computing device 1020 may receive a device command from the tracking system server 1010. The device command may include or be sent with instructions to forward or retransmit the device command to the remote device 1040. For example, the device command may include the device identification or another reference to the remote device that enables the computing device 1020 to send the device command to the correct remote device.

At step 1418, the computing device 1020 may transmit the device command to the remote device using the device identification. In particular embodiments, the computing device 1020 may establish or re-establish a communication session with the remote device according to the communication protocols of the network used. For example, the remote device and computing device may communicate by establishing a communication session to send the tracking signal. If the communication session is still active when the computing device 1020 receives the device command from the tracking system server 1040, the computing device 1020 may forward the device command to the remote device. If the communication session is no longer active (e.g., if the connection timed out, or if the computing device 1020 had to close the session for another reason), the computing device 1020 may ping the remote device to re-establish the communication session or start a new communication session. In particular embodiments, the computing device 1020 and remote device (e.g., tracking device 1040) may have communicated using a sessionless communication protocol. For example, the tracking signal may have been received as a beacon signal with the necessary tracking information (e.g., device identification) encoded within the signal. The computing device 1020 may then communicate back with the remote device by encoding the device commands within a beacon signal addressed to (or only decryptable by) the remote device. The computing device 1020 may optionally receive a confirmation of receipt of the device commands.

At step 1420, the computing device 1020 may await confirmation of performance of the device command from the remote device. The computing device 1020 may be configured to wait for a predetermined period of time for the remote device to send the confirmation. If, after the allotted period of time, the computing device 1020 has not received the confirmation, the method may proceed to step 1422 (path "No" in FIG. 14).

At step 1422, the computing device 1020 may determine whether a number of attempts to transmit the device command satisfies a threshold number of attempts. The computing device 1020 may be configured to resend the device command a predetermined number of times over a predetermined period of time. For example, the computing device 1020 may receive, from the tracking system, an instruction with the device command indicating that the computing device should resend the device command up to 10 times over a minute. Thus, every six seconds that the computing device 1020 has now received a confirmation message, the computing device 1020 will resend the device command. If the threshold number of attempts has not been reached, the method will return to step 1418 and retransmit the device command to the remote device. If the number of attempts has been satisfied, then the method may proceed to step 1424.

At step 1424, the computing device 1020 determines that the computing device 1020 is not able to communicate the device commands to the remote device. The computing device 1020 may determine that the remote device is lost to the tracking system, at least from the perspective of the computing device 1020. The computing device 1020 may transmit a notification of the remote device as lost, or at least a notification of the loss of the ability to communicate with the remote device, to the tracking system server 1010.

If, at step 1420, the computing device receives confirmation of performance of the device command from the remote device, the method may advance to step 1426 (path "Yes" in FIG. 14). The remote device may be configured to send another message along the communication session, or another beacon signal, confirming that the device commands have been performed. Where the device command relates to one or more features of the remote device, the confirmation may indicate whether some or all of the commands were performed and relay any reasons why commands were not performed. At step 1426, the computing device 1020 may transmit confirmation of performance of the device command to the tracking system server 1040. The computing device 1020 may retransmit the confirmation received from the remote device along to the tracking system server (e.g., using the longer-range communication network). The computing device may also modify the confirmation message as needed before transmitting.

Figure 15:
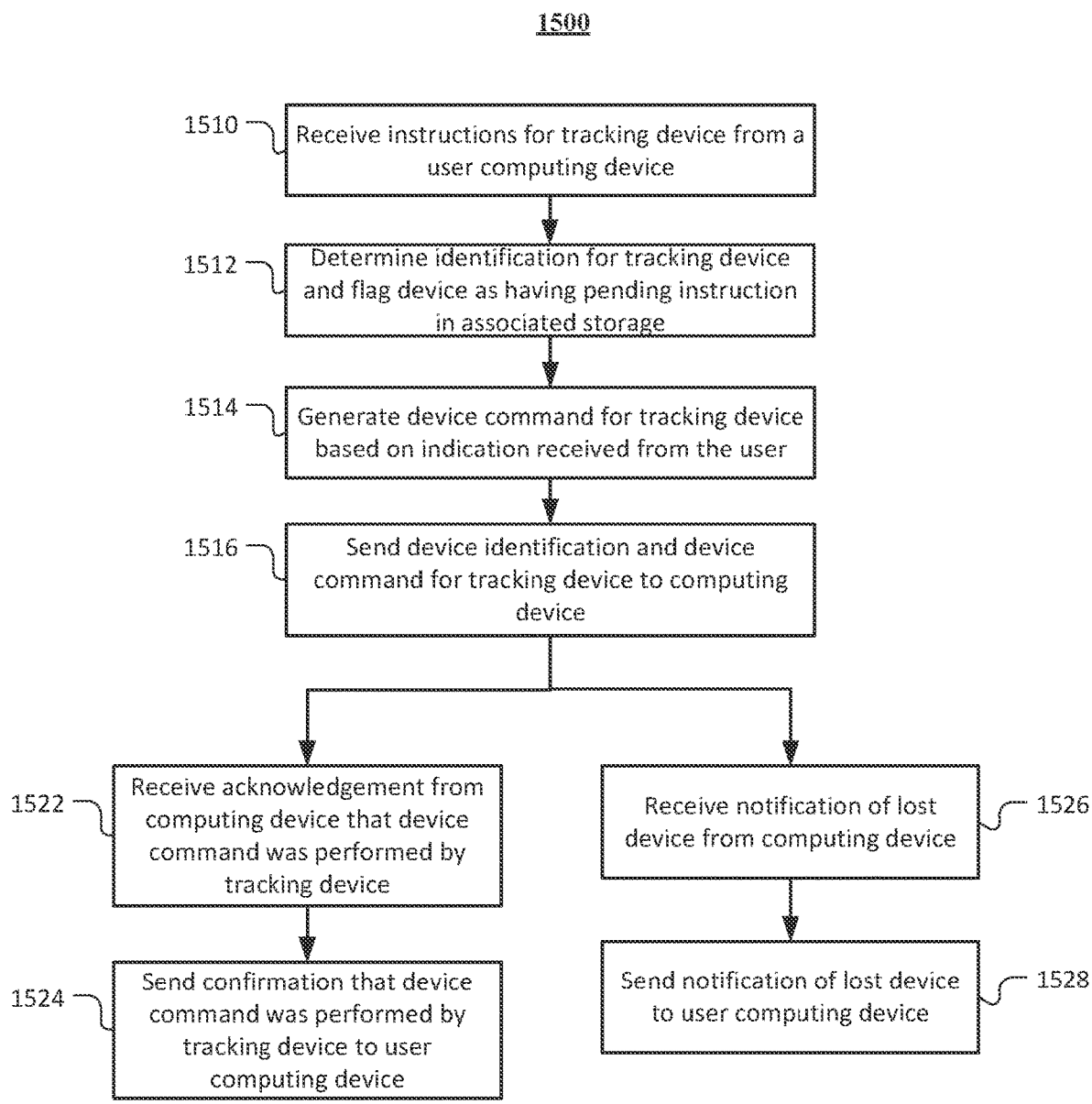
FIG. 15 is a flow chart illustrating a process for remotely performing a command on a tracking device based on an instruction from a user computing device that may be performed by a tracking system server, according to one embodiment.

FIG. 15 is a flow chart illustrating a process or method for remotely performing a command on a tracking device based on an instruction from a user computing device that may be performed by a tracking system server, according to one embodiment. In other embodiments, the method 1500 may include additional steps not shown in FIG. 15, and some of the steps in the method 1500 may be omitted or performed in a different order.

The method may begin at step 1510 where the tracking system server 1010 may receive instructions intended for a tracking device 1040 from the user computing device 1001. The tracking system server 1040 and user computing device 1001 may communication over a first communication network such as a long distance communication network. The instructions may be generated by the user computing device 1001 in response to a request from a user of the user computing device or may be generated automatically in response to, for example, a determination that the tracking device 1040 is misplaced. In particular embodiments, the tracking system server 1040 may generate the instructions itself in response to a determination that the instructions should be sent to the tracking device 1040 on behalf of the user associated with the tracking device 1040.

At step 1512, the tracking system server 1010 may determine an identification for the tracking device 1040 (e.g., a device ID) and may flag the tracking device 1040 as having a pending instruction. The tracking system server 1010 may parse, decode, and/or decrypt the instructions received from the user computing device 1001 to determine the identification for the tracking device 1040. The tracking system server 1010 may flag the tracking device, e.g., update a status associated with the tracking device ID in one or more associated data stores of the tracking system server 1010, to indicate that the tracking device 1040 has a pending instruction.

At step 1514, the tracking system server 1040 may generate a device command for the tracking device 1040 based on the indication and instructions received from the user computing device 1001. The tracking system server 1040 may identify the instruction received from the user computing device 1001 and may encode and/or encrypt the instruction in a message for the tracking device 1040.

At step 1516, the tracking system server 1040 may send the device identification for the tracking device 1040 and the generated device command to one or more computing devices 1020 associated with the tracking system. For example, the one or more computing devices may be executing an application associated with the tracking system enabling secure communication with the tracking system server. The tracking system server 1010 may choose the computing device 1020 to which to send the device identification and device command based on a variety of factors, including, but not limited to, the computing device 1020 having recently communicated or received a tracking signal associated with the tracking device 1040, the computing device 1020 being located at or near a previous location associated with the tracking device 1040 (such as a last known location), the computing device 1020 having particular hardware components that would advantage the computing device 1020 in communicating with the tracking device 1040 (e.g., having a more powerful transceiver), a user of the computing device 1020 being in some way associated with the user of the user computing device (e.g., as a part of a common cohort of users, friend group, social network, etc.), and other suitable factors. The tracking system server 1010 may send the device identification and device command to all computing devices associated with tracking system. The tracking system server send the device identification and device command to all computing device 1020 within a particular geographic region. The tracking system server may further send instructions for the computing device 1020 to transmit the device command to the tracking device 1040 (e.g., the remote device which the computing device 1020 had been communicating with). The tracking system server 1040 may then await a response from the computing device 1020.

At step 1522, the tracking system server 1010 may receive an acknowledgement from the computing device 1020 indicating that the device command was performed by the tracking device 1040. In response to receiving the acknowledgement from the computing device 1020, the tracking system server 1040 may, at step 1524, send a confirmation to the user computing device 1001 that the device command was performed by the tracking device 1040.

At step 1526, the tracking system server 1010 may receive a notification of a lost device from the computing device 1020. The notification of a lost device may indicate that the computing device 1020 was unable to send the device command to the tracking device 1020. The tracking system server 1040 may attempt to identify additional computing devices 1020 that are in communication range of the tracking device 1040. For example, the tracking system server 1010 may search its databases for one or more computing devices 1020 that have a location near the last known location of the tracking device 1040. The tracking system server 1040 may also await further tracking signals from other computing devices 1020 indicating that they have received a communication signal from the tracking device 1040. The tracking system server may send the device command and device ID to the other identified computing devices 1020 and await a confirmation message from those devices (as in step 1522). If, after a threshold amount of time or failed attempts to send the device command to the tracking device 1040, the tracking system server 1040 may, at step 1328 send a notification to the user computing device 1528 that the tracking system server 1040 was unable to send a device command to the tracking device 1040. The notification to the user computing device 1328 may further indicate that the tracking device 1040 is currently lost to the tracking system but provide a most recent last known location.

Figure 16:
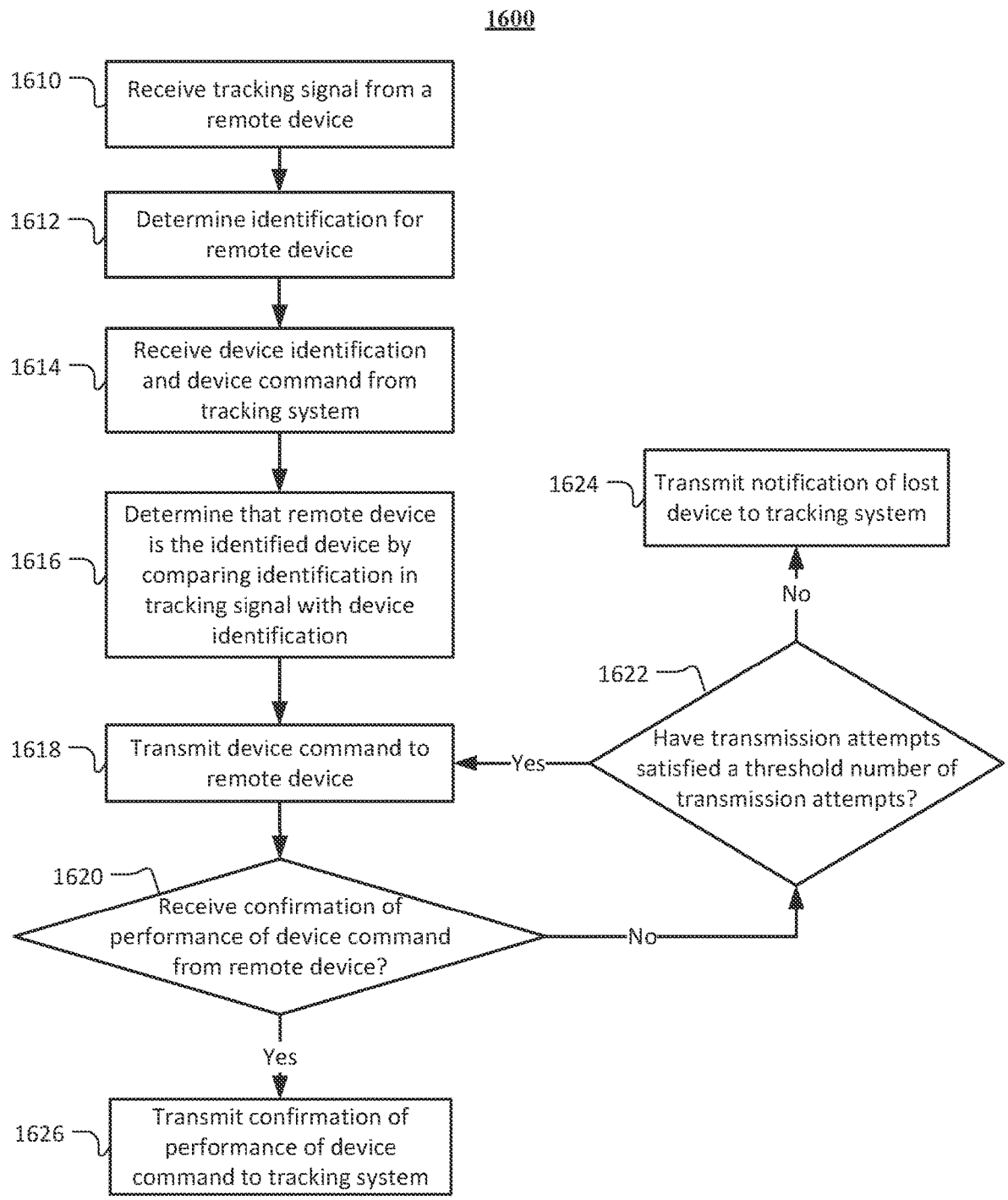
FIG. 16 is a flow chart illustrating a process for remotely performing a command on a tracking device based on an instruction from a user computing device that may be performed by a computing device, according to one embodiment.

FIG. 16 is a flow chart illustrating a process or method for remotely performing a command on a tracking device based on an instruction from a user computing device that may be performed by a computing device, according to one embodiment. In other embodiments, the method 1600 may include additional steps not shown in FIG. 16, and some of the steps in the method 1600 may be omitted or performed in a different order.

The method may begin at step 1610 where a computing device 1020 receives a tracking signal or other kind of communication signal from a remote device (e.g., a tracking device 1040). The tracking signal may be received via a communication network or protocol specializing in short-range device communications (e.g., second network 1030). The computing device 1020 may be associated with a tracking system and be executing an application associated with the tracking system enabling communication with tracking devices (e.g., tracking device 1040) and a tracking system server 1010.

At step 1612, the computing device 1020 may determine an identification for the remote device. For example, the computing device 1020 may determine a device ID for the remote device, where the device ID is a unique identifier for the remote device assigned by the tracking system or a manufacturer of the remote device. The computing device 1020 may parse, decode, or decrypt the tracking signal to determine the identification. For example, the tracking signal may have the device identification embedded within it so that the computing device 1020, using the application associated with the tracking system, can easily determine the device identification.

At step 1614, the computing device 1020 may receive a device identification and device command from the tracking system server 1010. The device identification may be capable of being used by the computing device to identify a remote device associated with the tracking system. The device command may include or be sent with instructions to forward or retransmit the device command to a remote device with a device identification matching the device identification. For example, the device command may include the device identification or another reference to the remote device that enables the computing device 1020 to send the device command to the correct remote device. The computing device 1020 may store the device command in association with the device identification in one or more secure datastores of the computing device 1020. For example, the computing device 1020 may have reserved storage for use by the tracking system or the application associated with the tracking system executing on the computing device. The computing device 1020 may use the storage to store information about remote devices that the computing device 1020 has previously communicated with or to store device commands issued by the tracking system server 1010.

At step 1616, the computing device 1020 may determine that the remote device from which it received the tracking signal is the device identified by a device identification received from the tracking system server 1010 and stored in the datastores of the computing device 1020. The computing device 1020 may retrieve the device commands associated with the remote device.

At step 1618, the computing device 1020 may transmit the device command to the remote device using the device identification. In particular embodiments, the computing device 1020 may establish or re-establish a communication session with the remote device according to the communication protocols of the network used. For example, the remote device and computing device may communicate by establishing a communication session to send the tracking signal. If the communication session is still active when the computing device 1020 receives the device command from the tracking system server 1040, the computing device 1020 may forward the device command to the remote device. If the communication session is no longer active (e.g., if the connection timed out, or if the computing device 1020 had to close the session for another reason), the computing device 1020 may ping the remote device to re-establish the communication session or start a new communication session. In particular embodiments, the computing device 1020 and remote device (e.g., tracking device 1040) may have communicated using a sessionless communication protocol. For example, the tracking signal may have been received as a beacon signal with the necessary tracking information (e.g., device identification) encoded within the signal. The computing device 1020 may then communicate back with the remote device by encoding the device commands within a beacon signal addressed to (or only decryptable by) the remote device. The computing device 1020 may optionally receive a confirmation of receipt of the device commands.

At step 1620, the computing device 1020 may await confirmation of performance of the device command from the remote device. The computing device 1020 may be configured to wait for a predetermined period of time for the remote device to send the confirmation. If, after the allotted period of time, the computing device 1020 has not received the confirmation, the method may proceed to step 1622 (path "No" in FIG. 16).

At step 1622, the computing device 1020 may determine whether a number of attempts to transmit the device command satisfies a threshold number of attempts. The computing device 1020 may be configured to resend the device command a predetermined number of times over a predetermined period of time. For example, the computing device 1020 may receive, from the tracking system, an instruction with the device command indicating that the computing device should resend the device command up to 10 times over a minute. Thus, every six seconds that the computing device 1020 has now received a confirmation message, the computing device 1020 will resend the device command. If the threshold number of attempts has not been reached, the method will return to step 1618 and retransmit the device command to the remote device. If the number of attempts has been satisfied, then the method may proceed to step 1624.

At step 1624, the computing device 1020 determines that the computing device 1020 is not able to communicate the device commands to the remote device. The computing device 1020 may determine that the remote device is lost to the tracking system, at least from the perspective of the computing device 1020. The computing device 1020 may transmit a notification of the remote device as lost, or at least a notification of the loss of the ability to communicate with the remote device, to the tracking system server 1010.

If, at step 1620, the computing device receives confirmation of performance of the device command from the remote device, the method may advance to step 1626 (path "Yes" in FIG. 16). The remote device may be configured to send another message along the communication session, or another beacon signal, confirming that the device commands have been performed. Where the device command relates to one or more features of the remote device, the confirmation may indicate whether some or all of the commands were performed and relay any reasons why commands were not performed. At step 1626, the computing device 1020 may transmit confirmation of performance of the device command to the tracking system server 1040. The computing device 1020 may retransmit the confirmation received from the remote device along to the tracking system server (e.g., using the longer-range communication network). The computing device may also modify the confirmation message as needed before transmitting.

Figure 17:
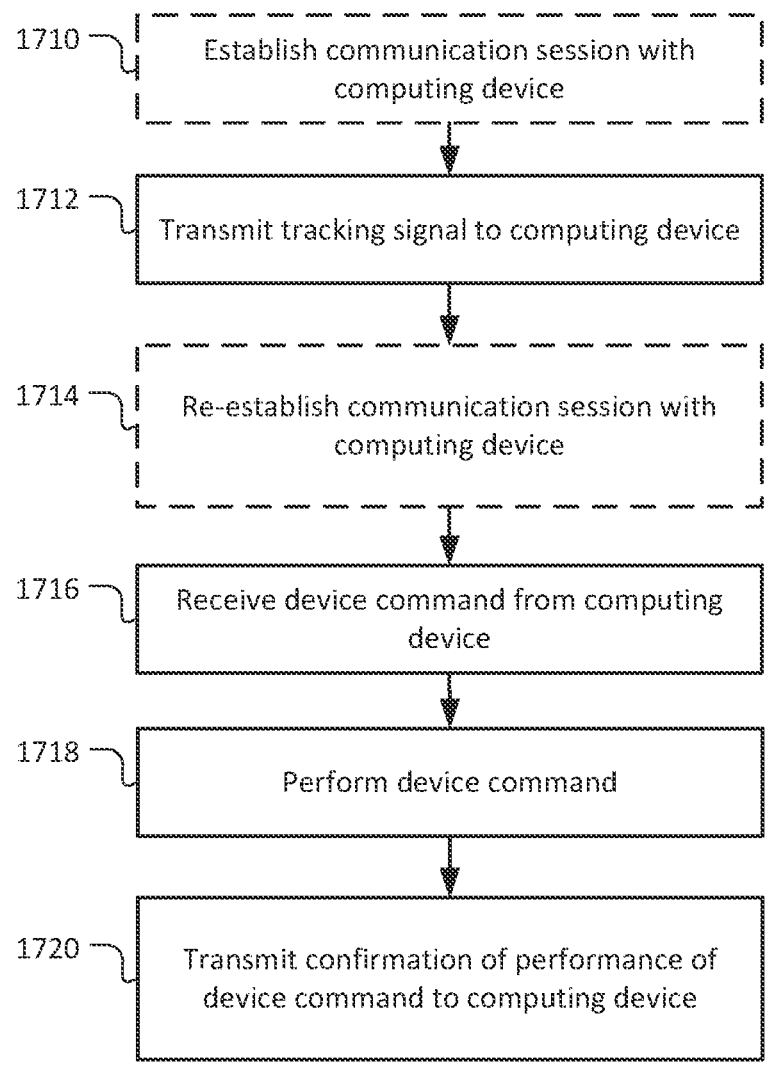
FIG. 17 is a flow chart illustrating a process for remotely performing a command on a tracking device based on an instruction from a user computing device that may be performed by a tracking device, according to one embodiment.

FIG. 17 is a flow chart illustrating a process or method for remotely performing a command on a tracking device based on an instruction from a user computing device that may be performed by a tracking device, according to one embodiment. In other embodiments, the method 1700 may include additional steps not shown in FIG. 17, and some of the steps in the method 1700 may be omitted or performed in a different order.

In particular embodiments, the method may begin at step 1712, where the tracking device 1040 establishes a communication session with a computing device within a communication range of the tracking device. The tracking device 1040 may send a probe beacon out to all computing devices within a communication range of the tracking device 1040. The beacon may request a connection with the computing devices and may be used to determine a protocol to use to establish the communication session. In particular embodiments, one or more steps of establishing the communication session and transmitting and receiving data with the computing device may be specially encoded or encrypted to as to protect the data being transmitted from being intercepted and/or read by devices not associated with the user of the tracking device and the tracking system.

In particular embodiments, the method 1700 may continue to step 1712, where the tracking device 1040 may transmit a tracking signal to the computing device 1020. As noted in FIG. 17, in particular embodiments, the method 1700 may begin with step 1712, such as in embodiments where the tracking device 1040 communicates with computing devices using beacon signals that do not require the tracking device 1040 to first establish a communication session with the computing device 1020. The tracking signal may contain information sufficient to identify the tracking device (e.g., a device identification), location information associated with the tracking device, and other suitable information as described above. Where the tracking device 1040 is communicating using beacon signals, the tracking device 1040 may merely send the tracking signal out to all devices within a communication range of the tracking device 1040. The tracking device 1040 may also include a device address with the tracking signal allowing recipient computing devices to determine whether beacon is intended for them.

In particular embodiments, at some point after transmitting the tracking signal, the tracking device 1040 may re-establish a communication session with the computing device 1020. As discussed previously, this step may be optional in embodiments where the tracking device 1040 and computing device 1020 communicate using a sessionless communication protocol or where the communication session established step 1710 remains active.

At step 1716, the tracking device 1040 receives a device command from the computing device 1020. The device command may relate to one or more features of the tracking device or to one or features of another device in which the tracking device is embodied. For example, the tracking device may have tracking device functions and primary device functions, especially where the primary function of the tracking device is something other than providing for device tracking functionality. For example, the tracking device may be, or may be embedded within, a smartphone, a laptop computer, a wireless speaker, etc. The device commands may be associated with one or more primary device functions. For example, the device commands may indicate that laptop computer or smart phone functions of the tracking device should be disabled until security challenges can be answered by a user of the laptop computer or smartphone. The device commands may also indicate which user of the tracking system is responsible for issuing the device commands. In some embodiments, only the primary user (e.g., owner) of the tracking device will have the authorization to issue device commands. In some embodiments, another user of the tracking system may have authorization to issue device commands to tracking device on behalf of or superseding a primary device user. For example, a parent account may have authorization to issue device commands to a laptop computer owned by a child account associated with the parent account. As another example, a company administrator may have authorization to issue device commands to a smartphone used by an employee of the company. The tracking device may store the identity of the user that issued the device commands so that the user of the tracking device can determine who sent the commands or so that the person who sent the commands can create a record of the actions they have taken.

At step 1718, the tracking device 1040 performs the functions associated with the device command using the one or more device features identified by the device command received from the computing device 1020.

At step 1720, the tracking device 1040 transmits confirmation of performance of the device command to the computing device 1020. As before, the tracking device 1040 may re-establish a communication session with the computing device 1020 if necessary, based on the needs of the communication protocol used by the computing device 1020 and tracking device 1040. The tracking device 1040 may transmit the confirmation to the computing device so that the tracking system 1010 can receive verification that the commands have bene performed.

Particular embodiments may repeat one or more steps of the methods of FIGS. 13-17, where appropriate. Although this disclosure describes and illustrates particular steps of the methods of FIGS. 13-17 as occurring in a particular order, this disclosure contemplates any suitable steps of the methods of FIG. 13-17 occurring in any suitable order. Moreover, although this disclosure describes and illustrates example methods for remotely performing device commands on a tracking device including the particular steps of the methods of FIG. 13-17, this disclosure contemplates any suitable method for remotely performing device commands on a tracking device including any suitable steps, which may include all, some, or none of the steps of the methods of FIG. 13-17, where appropriate. Furthermore, although this disclosure describes and illustrates particular components, devices, or systems carrying out particular steps of the methods of FIG. 13-17, this disclosure contemplates any suitable combination of any suitable components, devices, or systems carrying out any suitable steps of the methods of FIG. 13-17.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a tracking system server, an instruction from a first computing device relating to a feature of a second computing device;
receiving, by the tracking system server, a notification from a third computing device that the third computing device has received a tracking signal from the second computing device;
in response to receiving the instruction relating to the feature of the second computing device and the notification that the third computing device has received the tracking signal, transmitting, by the tracking system server to the third computing device, an instruction for the second computing device relating to the feature, the third computing device configured to transmit the instruction to the second computing device;
receiving, by the tracking system server, a response message from the third computing device indicating that the second computing device has not received the instruction for the second computing device;
transmitting, by the tracking system server to the third computing device, a request to retransmit the instruction to the second computing device;
receiving, by the tracking system server, a response message from the third computing device indicating that the second computing device has acknowledged the instruction for the second computing device; and
transmitting, by the tracking system server to the first computing device, a response message indicating that the second computing device has acknowledged the instruction for the second computing device;
wherein the response message from the third computing device indicating that the second computing device has not received the instruction for the second computing is received from the third computing device after the third computing device has waited for a predetermined period of time.

2. The method of claim 1, wherein the response message from the third computing device indicating that the second computing device has not received the instruction for the second computing is received from the third computing device after the third computing device has completed a threshold number of attempts to send the instruction for the second computing device to the second computing device.

3. The method of claim 1, wherein the second computing device has a tracking component and a functional component configured to implement the feature, wherein the functional component and the feature are both unrelated to tracking the second computing device.

4. The method of claim 3, wherein the tracking component of the second computing device is configured to provide received instructions to the functional component of the second computing device.

5. The method of claim 1, wherein the instruction from the first computing device relating to the feature of the second computing device further comprises an identification for the second computing device, and wherein the method further comprises:
  storing, by the tracking system server, the identification for the second computing device in association with the instruction relating to the feature of the second computing device.

6. The method of claim 1, further comprising:
  prior to transmitting the instruction for the second computing device relating to the feature to the third computing device, authenticating, by the tracking system server, a relationship between the first computing device and the second computing device or a relationship between a user of the first computing device and a user of the second computing device.

7. The method of claim 1, further comprising:
  receiving a notification from the second computing device via the third computing device that the second computing device has complete the instruction for the second computing device relating to the feature; and
  in response to receiving the notification from the second computing device, transmitting, by the tracking system server to the first computing device, a confirmation that the second computing device has completed the instruction for the second computing device relating to the feature.

8. The method of claim 1, wherein the second computing device is a laptop computer, a smartphone, a wireless speaker, a fitness tracker, or a camera.

9. A method comprising:
  receiving, by a first computing device and from a second computing device, a tracking signal;
  sending, by the first computing device and to a tracking system server, a notification that the first computing device has received the tracking signal from the second computing device;
  receiving, by the first computing device and from the tracking system server, an instruction for the second computing device, wherein the instruction for the second computing device comprises an instruction relating to a feature of the second computing device;
  attempting, by the first computing device, to send the instruction for the second computing device to the second computing device;
  after determining that the first computing device is unable to send the instruction for the second computing device to the second computing device, sending, by the first computing and to the tracking system server, a response message indicating that the first computing device is unable to send the instruction for the second computing device to the second computing device;
  receiving, by the first computing device and from the tracking system server, a request to retransmit the instruction for the second computing device to the second computing device;
  sending, by the first computing device and to the second computing device, the instruction for the second computing device;
  receiving, by the first computing device and from the second computing device, acknowledgement of the instruction for the second computing device; and
  sending, by the first computing device and to the tracking system server, a response message indicating that the second computing device has acknowledged the instruction for the second computing device;
  wherein determining that the first computing device is unable to send the instruction for the second computing device to the second computing device comprises waiting a predetermined period of time for acknowledgement of the instruction for the second computing device.

10. The method of claim 9, wherein determining that the first computing device is unable to send the instruction for the second computing device to the second computing device comprises completing a threshold number of attempts to send, to the second computing device, the instruction for the second computing device.

11. The method of claim 9, wherein the acknowledgement of the instruction for the second computing device comprises confirmation that the second computing device has performed the instruction for the second computing device.

12. The method of claim 9, wherein the second computing device has a tracking component and a functional component configured to implement the feature, wherein the functional component and the feature are both unrelated to tracking the second computing device.

13. The method of claim 9, wherein the second computing device is a laptop computer, a smartphone, a wireless speaker, a fitness tracker, or a camera.

14. The method of claim 9, further comprising:
  determining, by the first computing device, an identification for the second computing device based on the received tracking signal; and
  sending, by the first computing device and to a tracking system server, the identification for the second computing device.

15. One or more non-transitory computer-readable media comprising instructions that, when executed by one or more processors of a first computing device, cause the first computing device to perform operations comprising:
  receiving, by a first computing device and from a second computing device, a tracking signal;
  sending, by the first computing device and to a tracking system server, a notification that the first computing device has received the tracking signal from the second computing device;
  receiving, by the first computing device and from the tracking system server, an instruction for the second computing device, wherein the instruction for the second computing device comprises an instruction relating to a feature of the second computing device;

attempting, by the first computing device, to send the instruction for the second computing device to the second computing device;

after determining that the first computing device is unable to send the instruction for the second computing device to the second computing device, sending, by the first computing and to the tracking system server, a response message indicating that the first computing device is unable to send the instruction for the second computing device to the second computing device;

receiving, by the first computing device and from the tracking system server, a request to retransmit the instruction for the second computing device to the second computing device;

sending, by the first computing device and to the second computing device, the instruction for the second computing device;

receiving, by the first computing device and from the second computing device, acknowledgement of the instruction for the second computing device; and sending, by the first computing device and to the tracking system server, a response message indicating that the second computing device has acknowledged the instruction for the second computing device;

wherein determining that the first computing device is unable to send the instruction for the second computing device to the second computing device comprises waiting a predetermined period of time for acknowledgement of the instruction for the second computing device.

16. The one or more non-transitory computer-readable media of claim 15, wherein determining that the first computing device is unable to send the instruction for the second computing device to the second computing device comprises completing a threshold number of attempts to send, to the second computing device, the instruction for the second computing device.

17. The one or more non-transitory computer-readable media of claim 15, wherein the acknowledgement of the instruction for the second computing device comprises confirmation that the second computing device has performed the instruction for the second computing device.

* * * * *